United States Patent
Park et al.

(10) Patent No.: US 10,047,183 B2
(45) Date of Patent: Aug. 14, 2018

(54) PHOTOREACTIVE COPOLYMER AND ALIGNMENT LAYER COMPRISING THE SAME

(71) Applicant: LG CHEM, LTD., Seoul (KR)

(72) Inventors: Eun Seok Park, Daejeon (KR); Sung-Ho Chun, Daejeon (KR); Dai Seung Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 272 days.

(21) Appl. No.: 14/915,512

(22) PCT Filed: Sep. 26, 2014

(86) PCT No.: PCT/KR2014/009045
§ 371 (c)(1),
(2) Date: Feb. 29, 2016

(87) PCT Pub. No.: WO2015/046964
PCT Pub. Date: Apr. 2, 2015

(65) Prior Publication Data
US 2016/0222147 A1 Aug. 4, 2016

(30) Foreign Application Priority Data

Sep. 30, 2013 (KR) .................. 10-2013-0116651
Sep. 25, 2014 (KR) .................. 10-2014-0128568

(51) Int. Cl.
*C09K 19/56* (2006.01)
*C08F 220/40* (2006.01)
(Continued)

(52) U.S. Cl.
CPC .......... *C08F 220/40* (2013.01); *C08F 232/08* (2013.01); *C08G 61/08* (2013.01);
(Continued)

(58) Field of Classification Search
CPC .... C08F 220/40; C08F 232/08; C08F 210/00; C08F 32/08; G08F 1/1337;
(Continued)

(56) References Cited

U.S. PATENT DOCUMENTS 5,464,669 A 11/1995 Kang et al.
2006/0160970 A1 7/2006 Kim et al.
(Continued)

FOREIGN PATENT DOCUMENTS

CN 101098840 A 1/2008
CN 102216364 A 10/2011
(Continued)

OTHER PUBLICATIONS

"Surface-Induced Parallel Alignment of Liquid Crystals by Linearly Polymerized Photopolymers"; Hoffmann, et al.; Jpn. J. Appl. Phys. vol. 31(1992) pp. 2155-2164.
(Continued)

*Primary Examiner* — Ruiyun Zhang
(74) *Attorney, Agent, or Firm* — Dentons US LLP

(57) ABSTRACT

There are provided a photoreactive copolymer and an alignment layer comprising the same, and more particularly, to a photoreactive copolymer including a copolymer of two different kinds of monomers, and an alignment layer comprising the same. The photoreactive copolymer according to the present invention may have excellent liquid crystal alignment property and alignment speed, easily change an alignment direction depending on a polarization direction, and have excellent solubility to an organic solvent, such that the photoreactive copolymer may be used in various fields such as a liquid crystal device, and the like.

15 Claims, 1 Drawing Sheet

(51) Int. Cl.
  *C08F 232/08*  (2006.01)
  *C09J 145/00*  (2006.01)
  *G02F 1/1337*  (2006.01)
  *C08G 61/08*  (2006.01)

(52) U.S. Cl.
  CPC ............. *C09J 145/00* (2013.01); *C09K 19/56*
        (2013.01); *G02F 1/133711* (2013.01); *G02F*
        *1/133788* (2013.01); *C08G 2261/135*
        (2013.01); *C08G 2261/148* (2013.01); *C08G*
        *2261/1424* (2013.01); *C08G 2261/1426*
        (2013.01); *C08G 2261/3324* (2013.01); *C08G*
        *2261/418* (2013.01); *C08G 2261/76* (2013.01);
                        *Y10T 428/1005* (2015.01)

(58) Field of Classification Search
  CPC . G08F 1/133711; G08F 1/133788; C08J 5/18;
        C07C 69/612; C07C 69/618; Y10T
        428/10; Y10T 428/1005
  USPC ........... 428/1.1, 1.2; 349/123; 526/246, 281,
                        526/282; 560/107; 568/667
  See application file for complete search history.

(56) References Cited

U.S. PATENT DOCUMENTS

2010/0047481 A1* 2/2010 Choi .................... C07C 51/567
                                                              428/1.2

2012/0076953 A1* 3/2012 Cho .................... C07C 69/736
                                                              428/1.2
2012/0076954 A1  3/2012 Yoo et al.

FOREIGN PATENT DOCUMENTS

| CN | 103119004 A | 5/2013 |
|---|---|---|
| EP | 0298408 A1 | 11/1989 |
| EP | 1188746 A1 | 3/2002 |
| EP | 1127870 A1 | 8/2011 |
| GB | 2307240 A | 5/1997 |
| JP | 11-181127 A | 7/1999 |
| JP | 2003-048998 A | 2/2003 |
| JP | 2005-330376 A | 12/2005 |
| JP | 4645787 B2 | 12/2010 |
| KR | 10-2002-0068195 A | 8/2002 |
| KR | 10-2003-0036948 A | 5/2003 |
| KR | 10-2006-0080552 A | 1/2008 |
| KR | 10-2010-0083103 A | 1/2010 |
| KR | 10-2010-0021751 A | 2/2010 |
| KR | 10-2009-0047720 A | 10/2012 |
| KR | 10-2012-0004915 A | 9/2013 |
| KR | 10-2012-0031882 A | 8/2015 |
| TW | 200630398 A | 9/2006 |

OTHER PUBLICATIONS

"Peculiarity of an Oblique Liquid Crystal Alignment Induced by a Photosensitive Orientant"; Dyaduysha, et al; J. Appl. Phys. vol. 34(1995) pp. L1000-L1002).

* cited by examiner

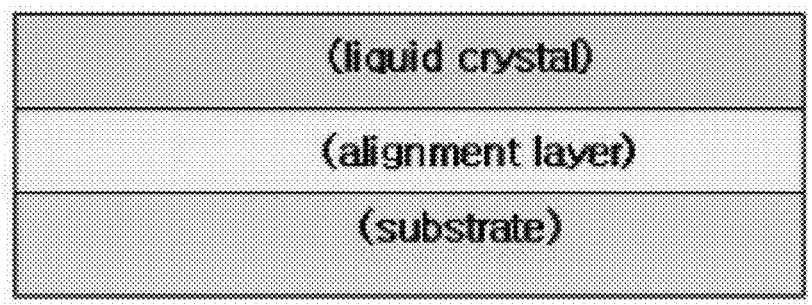

PHOTOREACTIVE COPOLYMER AND ALIGNMENT LAYER COMPRISING THE SAME

This application is a National Stage Entry of International Application No. PCT/KR2014/009045, filed Sep. 26, 2014, and claims the benefit of and priority to Korean Application Nos. 10-2013-0116651, filed on Sep. 30, 2013, and 10-2014-0128568, filed on Sep. 25, 2014 all of which are hereby incorporated by reference in their entirety for all purposes as if fully set forth herein.

TECHNICAL FIELD

The present invention relates to a photoreactive copolymer and an alignment layer comprising the same, and more particularly, to a photoreactive copolymer capable of having excellent liquid crystal alignment property and alignment speed, easily changing an alignment direction according to a polarization direction, and having excellent solubility, and an alignment layer comprising the same.

This application claims the benefit of Korean Patent Application No. 2013-0116651 filed on Sep. 30, 2013, with the Korean Intellectual Property Office and Korean Patent Application No. 2014-0128568 filed on Sep. 25, 2014, with the Korean Intellectual Property Office, the disclosure of which is incorporated herein by reference.

BACKGROUND

Recently, as a liquid crystal display has had a large size and accordingly, the use of the liquid crystal display has been expanded from a personal use such as a mobile phone, a notebook, or the like, to a family use such as a wall-mountable TV, or the like. Therefore, high-definition, high-quality, and a wide viewing angle are required in the liquid crystal display. Particularly, since in a thin film transistor liquid crystal display (TFT-LCD) operated by a thin film transistor, each pixel is independently operated, a response time of a liquid crystal is significantly excellent, such that high quality moving pictures may be implemented, such that an application range thereof has been gradually expanded.

In order to use the liquid crystal as an optical switch in the TFT-LCD as described above, the liquid crystal should be initially aligned in a predetermined direction on a layer on which the innermost thin transistor of a display cell is formed. To this end, a liquid crystal alignment layer is used.

For the liquid crystal alignment as described above, in the past, a rubbing process of applying a polymer such as polyimide, or the like, on a transparent glass to form a polymer alignment layer and rubbing the alignment layer while rotating a rotation roller rolled with a rubbing cloth such as nylon, rayon, or the like, at a high speed to thereby align the liquid crystal has been applied.

However, recently, due to various problems of the rubbing process, a so-called "photo-alignment" of irradiating light such as ultraviolet (UV) light to align a predetermined polymer and align liquid crystal using the aligned polymer has more frequently studied and applied. In the photo-alignment as described above, a photosensitive group bonded to a predetermined photoreactive copolymer causes photoreactions by linearly polarized UV, and a main chain of the polymer is aligned in a predetermined direction during this process, such that the liquid crystals are aligned, thereby forming a photopolymerized liquid crystal alignment layer.

As a representative example of photo-alignment as described above, photo-alignment by photopolymerization was published by M. Schadt et al. (Jpn. J. Appl. Phys., Vol31., 1992, 2155), Dae S. Kang et al. (U.S. Pat. No. 5,464,669), and Yuriy Reznikov (Jpn. J. Appl. Phys. Vol. 34, 1995, L1000). As a photo-alignment polymer used in the above-mention Patent and articles, a polycinnamate-based polymer such as poly(vinyl cinnamate) (PVCN) or poly (vinyl methoxycinnamate) (PVMC) is mainly used.

In the case of photo-aligning the polycinnamate-based polymer, double bonds of cinnamate form a cyclobutane through a [2+2] cycloaddition reaction by the irradiated UV, such that anisotropy is formed, and thus liquid crystal molecules are aligned in one direction, thereby inducing alignment of the liquid crystal.

In addition, a polymer having a side chain including a photo-sensitive group such as a cinnamic acid group, or the like, in a main chain of acrylate, methacrylate, or the like, and an alignment layer including the polymer have been disclosed in Japanese Patent Publication No. 11-181127. In addition, the use of an alignment layer made of a polymethacrylic polymer has been disclosed in Korean Patent Laid-Open Publication No. 2002-006819.

However, the prior photo-alignment polymers for an alignment layer described above had disadvantages in that stability of the alignment layer was deteriorated due to low thermal stability of the polymer main chain, or photoreactivity, a liquid crystal alignment property or an alignment speed was not sufficient. In addition, since solubility of the existing photoreactive copolymers in an organic solvent was not high, there was a problem that processability of applying and drying a composition containing the photoreactive copolymer to form an alignment layer was deteriorated.

In addition, there is an application field requiring a change in anisotropy direction uniquely depending on a polarization direction, for example, a patterned retarder applied in order to implement three dimensional stereoscopic images, or the like, a patterned cell alignment layer, or the like. In the case of the existing photoreactive copolymers, if an alignment direction is determined once by polarized light, the direction does not move, or even though the direction moves, polarized light having a larger light intensity in a different direction is required.

Therefore, a photoreactive copolymer having excellent photoreactivity to various types of light, or the like, should be developed.

DISCLOSURE

Technical Problem

The present invention has been made in an effort to provide a photoreactive copolymer capable of easily adjusting photoreactivity to various types of light and being used in an alignment layer, or the like, to have an improved interaction with liquid crystal molecules and excellent photoreactivity.

In addition, the present invention has been made in an effort to provide a preparation method of the photoreactive copolymer.

Further, the present invention has been made in an effort to provide an alignment layer comprising the photoreactive copolymer.

Technical Solution

An exemplary embodiment of the present invention provides a photoreactive copolymer comprising a copolymer of a cyclic olefin monomer represented by the following Chemical Formula 1 and a cyclic olefin monomer represented by the following Chemical Formula 2.

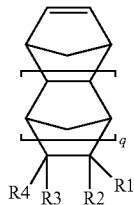

[Chemical Formula 1]

in Chemical Formula 1, q is an integer from 0 to 4;

at least one of R1, R2, R3, and R4 is a radical represented by the following Chemical Formula 1a, among R1 to R4, the remainders other than the radical of Chemical Formula 1a are the same as or different from one another and independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted arylalkyl having 5 to 12 carbon atoms; and a polar functional group including at least one selected from oxygen, nitrogen, phosphorus, sulfur, silicon, and boron, when R1 to R4 are not hydrogen, halogen, or a polar functional group, at least one combination of R1 and R2 or R3 and R4 is bonded to each other to form an alkylidene group having 1 to 10 carbon atoms, or R1 or R2 is bonded to either R3 or R4 to form a saturated or unsaturated aliphatic ring having 4 to 12 carbon atoms or an aromatic ring having 6 to 24 carbon atoms,

[Chemical Formula 1a]

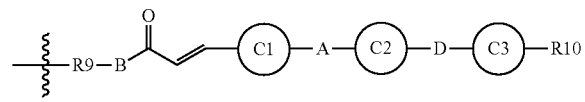

in Chemical Formula 1a,

A is selected from the group consisting of a single bond, substituted or unsubstituted alkylene having 1 to 20 carbon atoms, substituted or unsubstituted alkenylene having 2 to 20carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, B is a single bond, oxygen, sulfur, —NH—, or 1,4-phenylene, R9 is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, C1 is C6-C40 arylene unsubstituted or substituted with at least one functional group selected from the group consisting of halogen, cyano, and nitro; C7-C15 arylalkylene unsubstituted or substituted with at least one functional group selected from halogen, cyano, and nitro; or C4-C40 heteroarylene including a hetero element in Group 14, 15 or 16, C2 and C3 are each independently the same or different C6-C40 arylene unsubstituted or substituted with at least one functional group selected from the group consisting of halogen, cyano, and nitro; C4-C40 heteroarylene including a hetero element in Group 14, 15 or 16; C5-C10 cycloalkylene; or C4-C40 heterocycloalkylene including a hetero element in Group 14, 15, or 16, D is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, R10 is selected from the group consisting of hydrogen; halogen; cyano; nitro; —NCS; substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms,

[Chemical Formula 2]

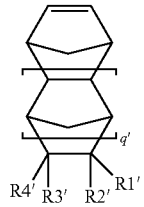

in Chemical Formula 2, q' is an integer from 0 to 4;

at least one of R1', R2', R3', and R4' is a radical selected from the group consisting of compounds represented by the following Chemical Formulas 2a and 2b, among R1' to R4', the remainders other than the radical of Chemical Formula 2a or 2b are the same as or different from one another and each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group including at least one selected from oxygen, nitrogen, phosphorus, sulfur, silicon, and boron, when R1' to R4' are not hydrogen; halogen; or a polar functional group, at least one combination of R1' and R2' or R3' and R4' is bonded to each other to form an alkylidene group having 1 to 10 carbon atoms, or R1' or R2' is bonded to either R3' or R4' to form a saturated or unsaturated aliphatic ring having 4 to 12 carbon atoms or an aromatic ring having 6 to 24 carbon atoms,

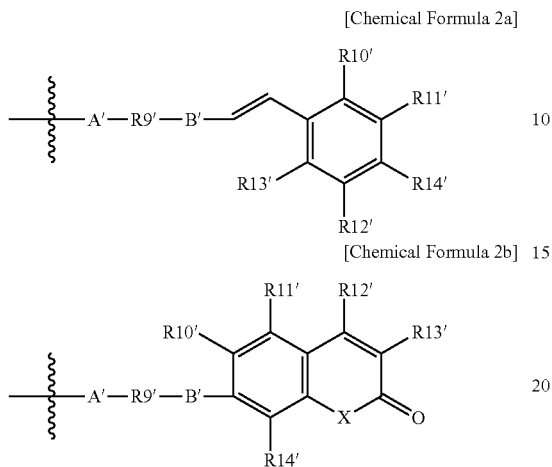

[Chemical Formula 2a]

[Chemical Formula 2b]

in Chemical Formulas 2a and 2b,

A' is a single bond, oxygen, sulfur, or —NH—,

B' is selected from the group consisting of a single bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms, X is oxygen or sulfur, R9' is selected from the group consisting of a single bond, substituted or unsubstituted alkylene having 1 to 20 carbon atoms, substituted or unsubstituted alkenylene having 2 to 20 carbon atoms, substituted or unsubstituted alkynylene having 2 to 20 carbon atoms, substituted or unsubstituted cycloalkylene having 3 to 12 carbon atoms, substituted or unsubstituted arylene having 6 to 40 carbon atoms, and substituted or unsubstituted arylalkylene having 7 to 15 carbon atoms, and at least one of R10', R11', R12', R13', and R14' is halogen, or C1-C20 alkyl substituted with halogen, and the remainders are the same as or different from one another and each independently selected from the group consisting of substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, heteroaryl having 6 to 40 carbon atoms and including a hetero element in Group 14, 15, or 16, and substituted or unsubstituted alkoxyaryl having 6 to 40 carbon atoms.

Another exemplary embodiment of the present invention provides a preparation method of a photoreactive copolymer comprising: performing an addition polymerization reaction of a monomer represented by the following Chemical formula 1 and a monomer represented by the following Chemical Formula 2 in the presence of a catalyst composition comprising a precatalyst including a transition metal in Group 10 and a cocatalyst to form a repeating unit of Chemical Formula 3a.

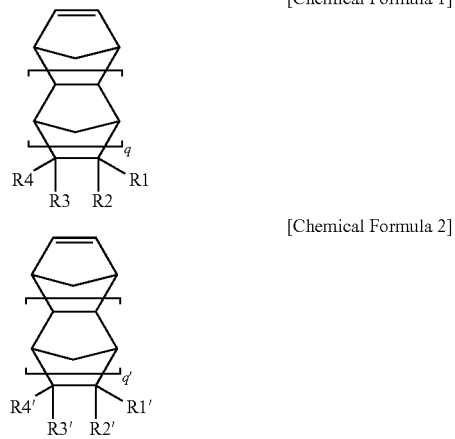

[Chemical Formula 1]

[Chemical Formula 2]

In Chemical Formulas 1 and 2, q, q', R1, R2, R3, R4, R1', R2', R3', and R4' are as described above.

Another exemplary embodiment of the present invention provides an alignment layer comprising the photoreactive copolymer.

Another exemplary embodiment of the present invention provides a liquid crystal retardation film comprising the alignment layer and a liquid crystal layer on the alignment layer.

Another exemplary embodiment of the present invention provides a display device comprising the alignment layer.

Advantageous Effects

In the photoreactive copolymer according to the present invention, a bulky substituent including aryl, heteroaryl, cycloalky, or heterocycloalkyl may be bonded to a terminal of a photoreactive group. The photoreactive copolymer has more excellent liquid crystal alignment property and alignment speed due to an influence of the bulky substituent as described above, as compared to the existing photoreactive copolymer.

Further, in the photoreactive copolymer, since a photoreactive group may relatively freely move, an alignment direction may be relatively freely changed depending on a polarization direction. Therefore, the photoreactive copolymer and the alignment layer comprising the same may be preferably applied to a patterned retarder, a patterned cell alignment layer, or the like, applied for implementation of three dimensional stereoscopic images, or the like.

In addition, the photoreactive copolymer may have excellent solubility to an organic solvent due to the substituent including aryl, heteroaryl, cycloalkyl, or heterocycloalkyl. Therefore, a process of forming a good alignment layer may be more easily performed by using a composition including the photoreactive copolymer.

Therefore, this photoreactive copolymer may be preferably applied to various coating compositions applied to various liquid crystal display devices, or the like, and an alignment layer easily formed from the coating composition as a photo-alignment polymer, and the alignment layer comprising the same may have excellent properties.

BRIEF DESCRIPTION OF THE DRAWINGS

FIG. 1 is a schematic diagram showing an example of a structure of an alignment layer according to an exemplary embodiment of the present invention.

BEST MODE

Terms used in the present specification are used in order to describe exemplary embodiments rather than limiting the present invention. Singular forms used in the specification are intended to include plural forms unless the context clearly indicates otherwise. Terms such as "comprise", "include", "have", and the like, used in the present specification will imply the existence of stated features, numbers, steps, configuration elements, or a combination thereof, but do not exclude presence or addition of one or more other features, numbers, steps, configuration elements, or a combination thereof.

Further, in the present specification, each layer or element is referred to as being formed "on" or "over" respective layers or elements, which means that each layer or element may be formed directly on respective layers or elements or another layer or element may be additionally formed between respective layers or on a target material or substrate.

The present invention may be variously modified and have various types, and exemplary embodiments of the present invention will be descried in detail. However, the present invention is not limited to the exemplary embodiments described herein, but all of the modifications, equivalents, and substitutions within the spirit and scope of the present invention are also included in the present invention.

Prior to a description of the present invention, each substituent used in the present specification will be specifically defined as follows:

First, the term "alkyl" as used herein refers to a monovalent linear or branched saturated hydrocarbon portion having 1 to 20 carbon atoms, preferably, 1 to 10 carbon atoms, more preferably 1 to 6 carbon atoms. The alkyl group inclusively refers to an alkyl group unsubstituted or additionally substituted with specific substituents to be described later. The examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, or the like.

First, the term "alkenyl" as used herein refers to a monovalent linear or branched hydrocarbon portion having 2 to 20 carbon atoms, preferably, 2 to 10 carbon atoms, more preferably 2 to 6 carbon atoms with at least one carbon-carbon double bond. The alkenyl group may form a bonding through carbon atoms including a carbon-carbon double bond or through saturated carbon atoms. The alkenyl group inclusively refers to an alkenyl group unsubstituted or additionally substituted with a specific substituent to be described later. The examples of the alkenyl group may include ethenyl, 1-propenyl, 2-propenyl, 2-butenyl, 3-butenyl, pentenyl, 5-hexenyl, dodecenyl, or the like.

The term "cycloalkyl" as used herein refers to a monovalent saturated or unsaturated mono-, bi- or tri-cyclic non-aromatic hydrocarbon portion having 3 to 12 ring-carbon atoms, and may inclusively refer to a cycloalkyl group additionally substituted with a specific substituent to be described later. The examples of the cycloalkyl group may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo[2,2,1]hept-5-enyl), or the like.

The term "aryl" as used herein refers to a monovalent mono-, bi- or tri-cyclic aromatic hydrocarbon portion having 6 to 40 ring atoms, preferably 6 to 12 ring atoms, and may inclusively refer to an aryl group additionally substituted with a specific substituent to be described later. The examples of the aryl group may include phenyl, naphthalenyl, fluorenyl, or the like.

The term "alkoxyaryl" as used herein refers to the above-defined aryl group in which at least one hydrogen atom is substituted by an alkoxy group. The examples of the alkoxyaryl group may include methoxyphenyl, ethoxyphenyl, propoxyphenyl, butoxyphenyl, pentoxyphenyl, hextoxyphenyl, heptoxy, octoxy, nanoxy, methoxybiphenyl, methoxynaphthalenyl, methoxyfluorenyl, methoxyanthracenyl, or the like.

The term "arylalkyl" as used herein refers to the above-defined alkyl group in which at least one hydrogen atom is substituted by an aryl group, and may inclusively refer to an arylalkyl group additionally substituted with a specific substituent to be described later. The examples of the arylalkyl may include benzyl, benzhydryl, trityl, or the like.

The term "alkynyl" as used herein refers to a monovalent linear or branched hydrocarbon portion having 2 to 20 carbon atoms, preferably 2 to 10 carbon atoms, more preferably 2 to 6 carbon atoms with at least one carbon-carbon triple bond. The alkynyl group may form a bonding through carbon atoms including a carbon-carbon triple bond or through saturated carbon atoms. The alkynyl group may inclusively refer to an alkynyl group additionally substituted with a specific substituent to be described later. The examples of the alkynyl group may include ethynyl, propynyl, or the like.

The term "alkylene" as used herein refers to a divalent linear or branched saturated hydrocarbon portion having 1 to 20 carbon atoms, preferably 1 to 10 carbon atoms, more preferably 1 to 6 carbon atoms. The alkylene group may inclusively refer to an alkylene group additionally substituted with a specific substituent to be described later. The examples of the alkylene group may include methylene, ethylene, propylene, butylene, hexylene, or the like.

The term "alkenylene" as used herein refers to a divalent linear or branched hydrocarbon portion having 2 to 20 carbon atoms, preferably 2 to 10 carbon atoms, more preferably 2 to 6 carbon atoms with at least one carbon-carbon double bond. The alkenylene group may form a bonding through carbon atoms including a carbon-carbon double bond and/or through saturated carbon atoms. The alkenylene group inclusively refers to an alkenylene group additionally substituted with a specific substituent to be described later.

The term "cycloalkylene" as used herein refers to a divalent saturated or unsaturated mono-, bi- or tri-cyclic non-aromatic hydrocarbon portion having 3 to 12 ring-carbon atoms, and may inclusively refer to a cycloalkylene group additionally substituted with a specific substituent to be described below. The examples of the cycloalkylene group may include cyclopropylene, cyclobutylene, or the like.

The term "arylene" as used herein refers to a divalent mono-, bi- or tri-cyclic aromatic hydrocarbon portion having 6 to 20 ring atoms, preferably 6 to 12 ring atoms and may inclusively refer to an arylene group additionally substituted with a specific substituent, as will be described later. The aromatic portion includes carbon atoms only. The examples of the arylene group may include phenylene, or the like.

The term "arylalkylene" as used herein refers to a divalent portion of the above-defined alkyl group in which at least one hydrogen atom is substituted by an aryl group, and may inclusively refer to an arylalkylene group additionally substituted with a specific substituent to be described later. The examples of the arylalkylene group may include benzylene, or the like.

The term "alkynylene" as used herein refers to a divalent linear or branched hydrocarbon portion having 2 to 20 carbon atoms, preferably 2 to 10 carbon atoms, more preferably 2 to 6 carbon atoms with at least one carbon-carbon triple bond. The alkynylene group may form a bonding through carbon atoms including a carbon-carbon triple bond or through saturated carbon atoms. The alkynylene group may inclusively refer to an alkynylene group additionally substituted with a specific substituent to be described later. The examples of the alkynylene group may include ethynylene, propynylene, or the like.

In the above description, the phrase "a substituent is substituted or unsubstituted" has an inclusive meaning that the substituent is or isn't additionally substituted with the substituent itself or another defined substituent. Unless otherwise defined in this specification, the examples of the substituent used as an additional substituent for each substituent may include halogen, alkyl, alkenyl, alkynyl, haloalkyl, haloalkenyl, haloalkynyl, aryl, haloaryl, arylalkyl, haloarylalkyl, alkoxy, haloalkoxy, carbonyloxy, halocarbonyloxy, aryloxy, haloaryloxy, silyl, siloxy, or "a polar functional group including oxygen, nitrogen, phosphorus, sulfur, silicon, or boron" to be described later.

Hereinafter, a photoreactive copolymer according to an exemplary embodiment of the present invention, an alignment layer, a retardation film, a display device, and the like, will be described in detail.

In accordance with an exemplary embodiment of the present invention, there is provided a photoreactive copolymer including a copolymer of a cyclic olefin monomer represented by the following Chemical Formula 1 and a cyclic olefin monomer represented by the following Chemical Formula 2.

[Chemical Formula 1]

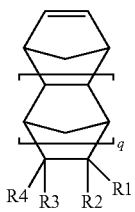

In Chemical Formula 1, q is an integer from 0 to 4;

at least one of R1, R2, R3, and R4 is a radical represented by the following Chemical Formula 1a, among R1 to R4, the remainders other than the radical of Chemical Formula 1a are the same as or different from one another and each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted arylalkyl having 5 to 12 carbon atoms; and a polar functional group including at least one selected from oxygen, nitrogen, phosphorus, sulfur, silicon, and boron, when R1 to R4 are not hydrogen, halogen, or a polar functional group, at least one combination of R1 and R2 or R3 and R4 is bonded to each other to form an alkylidene group having 1 to 10 carbon atoms, or R1 or R2 is bonded to either R3 or R4 to form a saturated or unsaturated aliphatic ring having 4 to 12 carbon atoms or an aromatic ring having 6 to 24 carbon atoms,

[Chemical Formula 1a]

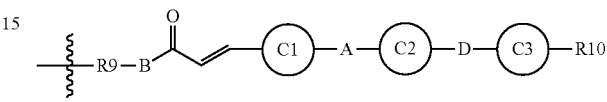

in Chemical Formula 1a,

A is selected from the group consisting of a single bond, substituted or unsubstituted alkylene having 1 to 20 carbon atoms, substituted or unsubstituted alkenylene having 2 to 20carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, B is a single bond, oxygen, sulfur, —NH—, or 1,4-phenylene, R9 is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, C1 is C6-C40 arylene unsubstituted or substituted with at least one functional group selected from the group consisting of halogen, cyano, and nitro; C7-C15 arylalkylene unsubstituted or substituted with at least one functional group selected from halogen, cyano, and nitro; or C4-C40 heteroarylene including a hetero element in Group 14, 15 or 16, C2 and C3 are each independently the same or different C6-C40 arylene unsubstituted or substituted with at least one functional group selected from the group consisting of halogen, cyano, and nitro; C4-C40 heteroarylene including a hetero element in Group 14, 15 or 16; C5-C10 cycloalkylene; or C4-C40 heterocycloalkylene including a hetero element in Group 14, 15, or 16, D is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, R10 is selected from the group consisting of hydrogen; halogen; cyano; nitro; —NCS; substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms,

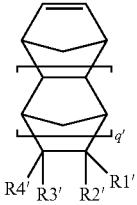

[Chemical Formula 2]

in Chemical Formula 2, q' is an integer from 0 to 4;

at least one of R1', R2', R3', and R4' is a radical selected from the group consisting of compounds represented by the following Chemical Formulas 2a and 2b, among R1' to R4', the remainders other than the radical of Chemical Formula 2a or 2b are the same as or different from one another and each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group including at least one selected from oxygen, nitrogen, phosphorus, sulfur, silicon, and boron, when R1' to R4' are not hydrogen; halogen; or a polar functional group, at least one combination of R1' and R2' or R3' and R4' is bonded to each other to form an alkylidene group having 1 to 10 carbon atoms, or R1' or R2' is bonded to either R3' or R4' to form a saturated or unsaturated aliphatic ring having 4 to 12 carbon atoms or an aromatic ring having 6 to 24 carbon atoms,

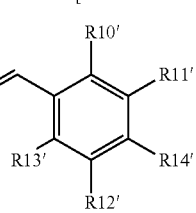

[Chemical Formula 2a]

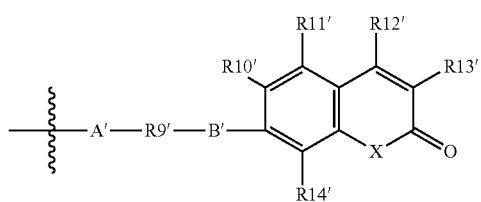

[Chemical Formula 2b]

in Chemical Formulas 2a and 2b,

A' is a single bond, oxygen, sulfur, or —NH—,

B' is selected from the group consisting of a single bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms, X is oxygen or sulfur, R9' is selected from the group consisting of a single bond, substituted or unsubstituted alkylene having 1 to 20 carbon atoms, substituted or unsubstituted alkenylene having 2 to 20 carbon atoms, substituted or unsubstituted alkynylene having 2 to 20 carbon atoms, substituted or unsubstituted cycloalkylene having 3 to 12 carbon atoms, substituted or unsubstituted arylene having 6 to 40 carbon atoms, and substituted or unsubstituted arylalkylene having 7 to 15 carbon atoms, and at least one of R10', R11', R12', R13', and R14' is halogen, or C1-C20 alkyl substituted with halogen, and the remainders are the same as or different from one another and each independently selected from the group consisting of substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, heteroaryl having 6 to 40 carbon atoms and including a hetero element in Group 14, 15, or 16, and substituted or unsubstituted alkoxyaryl having 6 to 40 carbon atoms.

Preferably, R1' of Chemical Formula 2 may be the radical represented by Chemical Formula 2a, and at least one of R10' to R14' of Chemical Formula 2a may be halogen.

The monomer represented by Chemical Formula 1 may have a chemical structure in which a predetermined photoreactive group (Chemical Formula 1a), for example, a cinnamate or chalcone structure is introduced in a cyclic olefin structure. A cyclic olefin compound of Chemical Formula 1 may be used as a photoreactive compound by itself due to the chemical structure in which the photoreactive group is introduced as described above.

In addition, due to structural characteristics of the cyclic olefin, a polymer may be prepared from the cyclic olefin compound, and the prepared polymer may also have excellent photoreactivity due to the photoreactive group. Therefore, various photoreactive compounds or polymers, or the like, capable of being applied to various optical application fields may be prepared using the cyclic olefin compound.

The monomer of Chemical Formula 1 may have a chemical structure in which a cyclic substituent (C2) is further bonded to the photoreactive group such as the cinnamate or chalcone structure via a specific functional group A. In addition, the monomer may have a chemical structure in which a cyclic substituent (C3) is further bonded to the photoreactive group via a specific functional group D.

For example, in the monomer of Chemical Formula 1, C1 may be C6-C40 arylene unsubstituted or substituted with at least one functional group selected from the group consisting of halogen, cyano, and nitro (for example, substituted or unsubstituted phenylene, 1,4- or 2,6-naphthylene, or the like); C7-C15 arylalkylene unsubstituted or substituted with at least one functional group selected from the group consisting of halogen, cyano, and nitro; or C4-C40 heteroarylene including a hetero element in Group 14, 15 or 16 (for example, 2,5-thiophenediyl, 2,5-furanylene, or the like).

In addition, C2 bonded to C1 via the specific functional group A may be C6-C40 arylene unsubstituted or substituted with at least one functional group selected from the group consisting of halogen, cyano, and nitro (for example, substituted or unsubstituted phenylene, 1,4- or 2,6-naphthylene, or the like); C4-C40 heteroarylene including a hetero element in Group 14, 15 or 16 (for example, 2,5-thiophenediyl, 2,5-furanylene, or the like); C5-C10 cycloalkylene (for example, cyclohexyl, or the like); or C4-C40 heterocycloalkylene including a hetero element in Group 14, 15 or 16 (for example, 1,3-dioxyl).

Further, C3 bonded to C2 via the specific functional group D may be C6-C40 arylene unsubstituted or substituted with at least one functional group selected from the group consisting of halogen, cyano, and nitro (for example, substituted or unsubstituted phenylene, 1,4- or 2,6-naphthylene, or the like); C4-C40 heteroarylene including a hetero element in Group 14, 15 or 16 (for example, 2,5-thiophenediyl, 2,5-furanylene, or the like); C5-C10 cycloalkylene (for example, cyclohexyl, or the like); or C4-C40 heterocycloalkylene including a hetero element in Group 14, 15 or 16 (for example, 1,3-dioxyl).

In addition, R10 may be selected from the group consisting of hydrogen; halogen; cyano; nitro; NCS; substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms.

In general, liquid crystal molecules have an aromatic or aliphatic ring, and the cyclic olefin compound or the photoreactive copolymer obtained from the cyclic olefin compound may have improved interactions with the liquid crystal molecules due to the aromatic or aliphatic cyclic substituent (C2 or C3) capable of being additionally bonded to the cyclic olefin compound, such that photo-alignment may be more effectively performed. Therefore, the cyclic olefin compound and the photoreactive copolymer obtained from the cyclic olefin compound may be preferably used in the liquid crystal alignment layer, or the like, to thereby have improved interactions with the liquid crystal molecules and excellent photoreactivity.

In addition, photoreactivity of the cyclic olefin compound itself and the photoreactive copolymer obtained therefrom may be easily adjusted by adjusting a structure of Chemical Formula 1a of the cyclic olefin compound, particularly, the kind of the additionally substituted cyclic substituents (C2 and C3), or the like, using various arylenes, heteroarylenes, cycloalkylenes, or heterocycloalkylenes. Therefore, various photoreactive compounds or copolymers, or the like, having excellent photoreactivity to various types of light, may be obtained from the cyclic olefin compound as described above.

Meanwhile, the monomer represented by Chemical Formula 2 may have a chemical structure in which a predetermined photoreactive group (Chemical Formulas 2a and 2b) is introduced in the cyclic olefin structure. A cyclic olefin compound of Chemical Formula 2 may be used as a photoreactive compound by itself due to the chemical structure in which the photoreactive group is introduced as described above.

Therefore, in a photoreactive copolymer and an alignment layer prepared from the monomer represented by Chemical Formula 2, the photoreactive groups such as the cinnamate structure may relatively freely move (flow) or react in a free space secured to be large, and hindrance by other reactive groups or subtituents, or the like, is minimized. As a result, the photoreactive groups in the photoreactive copolymer and the alignment layer may have more excellent photoreactivity, alignment speed, and photo-alignment property, and the like. Particularly, the photoreactive group such as the cinnamate structure, or the like, is photo-aligned in a scheme in which dimerization and isomerization are simultaneously generated by polarized light, and this photo-alignment may more smoothly and rapidly occur in the large free space without particular hindrance. As a result, the photoreactive copolymer and the alignment layer prepared from the cyclic olefin compound may have more excellent photoreactivity, alignment property, and alignment speed.

In addition, since the large free space is secured between the photoreactive groups in the photoreactive copolymer and the alignment layer, alignment directions of the photoreactive groups may be relatively freely changed depending on a change in a polarization direction. As a result, the alignment direction depending on the polarization direction may be more smoothly changed, and the photoreactive copolymer and the alignment layer may be preferably applied to a patterned retarder, a patterned cell alignment layer, or the like, applied for implementation of stereoscopic images, or the like.

Recently, in accordance with the requirement for a wide viewing angle, attempts to implement the wide viewing angle through multi-directional patternization of the liquid crystals by replacing a TFT-cell alignment layer with a photo-alignment layer and patterning have been reported. However, since in the existing alignment layer, a polarization direction is determined by a polarization direction, to make a pattern in a specific direction, a process using two masks is required. However, since in the photoreactive copolymer and the alignment layer comprising the same, even after irradiating polarized light once, the alignment direction may be changed again by polarized light in another direction, the desired alignment layer may be implemented by a single mask process.

In addition, as an experimental result, the present inventors confirmed that as the structure including cycloalkyl or heterocycloalkyl was bonded to a terminal of the photoreactive group, the cyclic olefin compound and the photoreactive copolymer obtained from the cyclic olefin compound may have more excellent solubility to various organic solvents. Therefore, even in the case of decreasing a use amount of an organic solvent during a process of forming the alignment layer using the photoreactive copolymer, a photoreactive copolymer composition may be suitably formed, such that the alignment layer may be more easily prepared by applying and drying the composition. In addition, processability for forming the alignment layer may be significantly improved by facilitating the application and drying, or the like, in this process.

Therefore, the photoreactive copolymer obtained by polymerizing the monomer represented by Chemical Formula 1 and the monomer represented by Chemical Formula 2 may be preferably used in a liquid crystal alignment layer, or the like, thereby having improved interactions with liquid crystal molecules and excellent photoreactivity. In addition, the photoreactive copolymer may improve processability for forming the alignment layer, or the like, simultaneously with having excellent photoreactivity to various types of light by suitably changing each substituent to adjust photoreactivity and solubility to an organic solvent.

According to an exemplary embodiment of the present invention, in the monomer represented by Chemical Formula 1 and the monomer represented by Chemical Formula 2, a polar functional group capable of being used as a substituent for R1 to R4, R1' to R4, and the like, that is, a polar functional group including at least one of oxygen, nitrogen, phosphorus, sulfur, silicon, and boron may be selected from the group consisting of the following functional groups, or may be selected from various other polar functional groups including at least one of oxygen, nitrogen, phosphorus, sulfur, silicon, or boron except for the following functional groups:

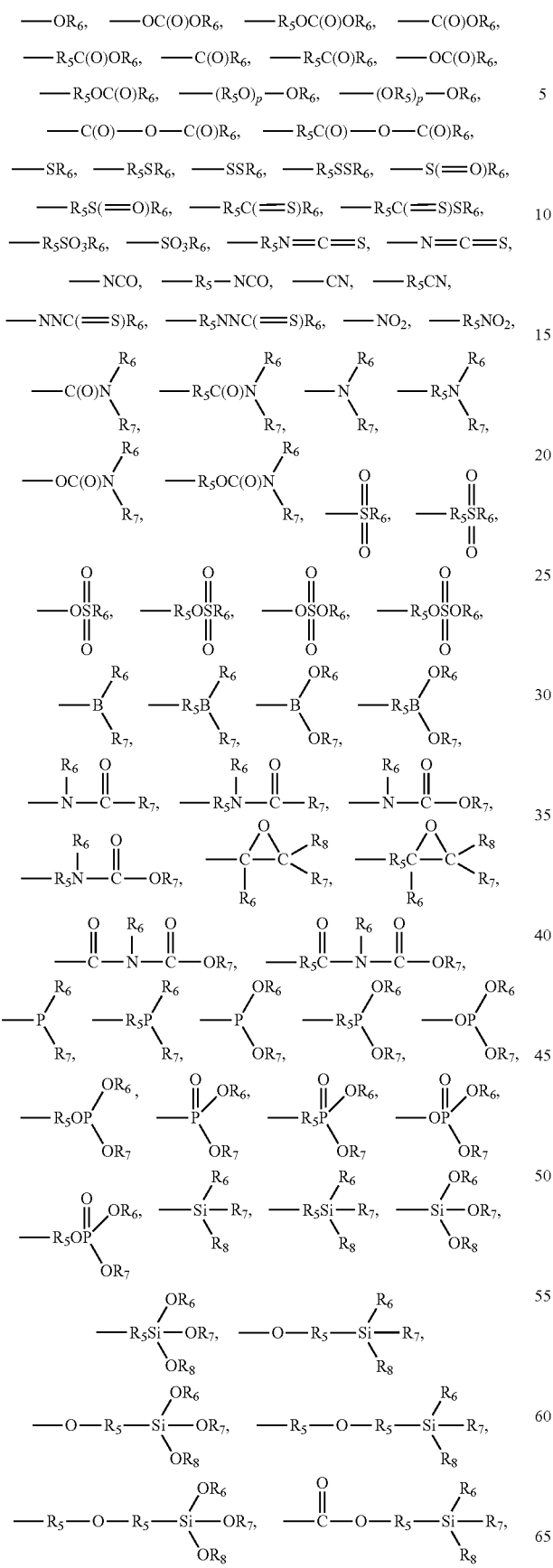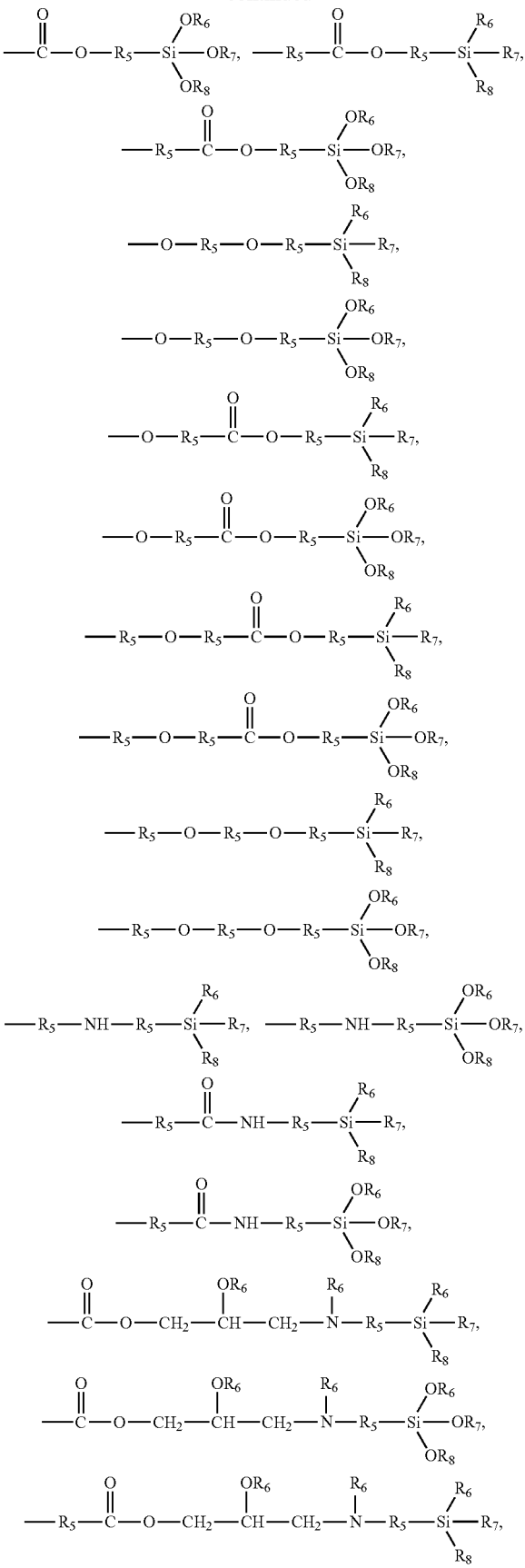

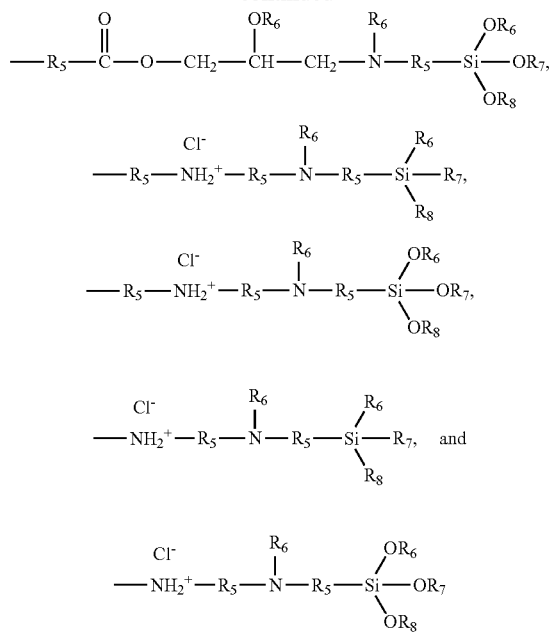

in the polar functional groups, each p is independently an integer from 1 to 10, $R_5$ is substituted or unsubstituted linear or branched alkylene having 1 to 20 carbon atoms; substituted or unsubstituted linear or branched alkenylene having 2 to 20 carbon atoms; substituted or unsubstituted linear or branched alkynylene having 2 to 20 carbon atoms; substituted or unsubstituted cycloalkylene having 3 to 12 carbon atoms; substituted or unsubstituted arylene having 6 to 40 carbon atoms; substituted or unsubstituted carbonyloxylene having 1 to 20 carbon atoms; or substituted or unsubstituted alkoxylene having 1 to 20 carbon atoms; and $R_6$, $R_7$, and $R_8$ are each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted alkoxy having 1 to 20 carbon atoms; and substituted or unsubstituted carbonyloxy having 1 to 20 carbon atoms.

In addition, the photoreactive copolymer may include the monomer represented by Chemical Formula 1 and the monomer represented by Chemical Formula 2 at a molar ratio of preferably, about 9:1 to about 1:9 and more preferably, about 6:4 to about 4:6.

The photoreactive copolymer including the copolymer of the monomer represented by Chemical Formula 1 and the monomer represented by Chemical Formula 2 may include, for example, a repeating unit of the following Chemical Formula 3a or a repeating unit of the following Chemical Formula 3b.

[Chemical Formula 3a]

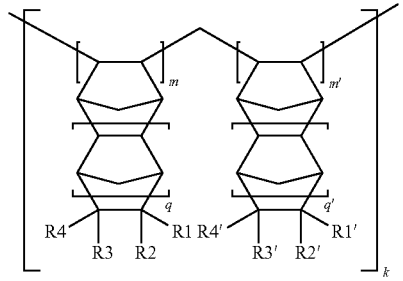

[Chemical Formula 3b]

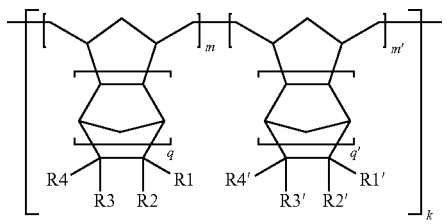

In Chemical Formulas 3a and 3b, each independently, m, m', and k are integers from 50 to 5000, q and q' are integers from 0 to 4, R1, R2, R3, and R4 are as defined in Chemical Formula 1, and R1', R2', R3', and R4' are as defined in Chemical Formula 2.

This photoreactive copolymer includes a repeating unit derived from two monomers as described above.

That is, the above-mentioned photoreactive copolymer includes a repeating unit derived from the monomer of Chemical Formula 1 to thereby have the structure of Chemical Formula 1a, particularly, the cyclic substituent (C2) additionally bonded thereto via the specific functional group A and the cyclic substituent (C3) bonded thereto via the specific functional group D, such that the photoreactive copolymer may have improved interactions with the liquid crystal molecules and excellent photoreactivity. In addition, excellent photoreactivity to various types of light may be exhibited by selecting and adjusting the cyclic substituents C2 and C3 rings from various arylenes, heteroarylenes, cycloalkylenes, and heterocycloalkylenes.

In addition, the above-mentioned photoreactive copolymer includes a repeating unit derived from the monomer of Chemical Formula 2, a large free space may be secured between the photoreactive groups due to a bulky structure bonded to terminals of the photoreactive groups. Therefore, the photoreactive groups may relatively freely move (flow) or react in the secured large free space, and more excellent photoreactivity, alignment speed, and photo-alignment property, and the like may be exhibited. In addition, the photoreactive groups may relatively freely change the alignment direction depending on a change in the polarization direction, such that the alignment direction depending on the polarization direction may be more smoothly changed, and the photoreactive copolymer may be preferably applied to the patterned retarder, the patterned cell alignment layer, or the like. Further, as the photoreactive copolymer has excellent solubility to the organic solvent, during a process of forming the alignment layer, more excellent processability such as applying and drying properties may be exhibited, and a use amount of the organic solvent may be decreased.

In Chemical Formulas 3a and 3b, a ration of m and m' may be preferably about 9:1 to about 1:9, and more preferably, about 6:4 to 4:6.

The photoreactive copolymer includes a norbonene-based repeating unit of Chemical Formula 3a or 3b as a main repeating unit. Since this norbonene-based repeating unit is structurally rigid, and the photoreactive copolymer including the norbonene-based repeating unit has a relative high glass transition temperature (Tg) of about 300° C. or more, preferably about 300 to 350° C., the photoreactive copolymer may have more excellent thermal stability as compared to the existing known photoreactive copolymer, or the like.

Since a definition of each substituent bonded to the photoreactive copolymer is specified above in detail in regard to the monomers of Chemical Formulas 1 and 2, a description thereof will be omitted.

In addition, the photoreactive copolymer may include only at least one repeating unit selected from the group consisting of the repeating units of Chemical Formula 3a or 3b, but may also be a copolymer further including another type of repeating units. The examples of this repeating unit may include any olefin-, acrylate- or cyclic-olefin-based repeating unit with or without a bonding to cinnamate-, chalcone- or azo-based photoreactive groups (for example, a general photoreactive group of which a bulky aralkyl structure is not introduced in a terminal). The exemplary repeating units are disclosed in Korean Patent Laid-Open Publication No. 2010-0021751, or the like.

However, in order to prevent a deterioration in various properties such as excellent alignment property and alignment speed, and the like, pertaining to the repeating unit of Chemical Formula 3a or 3b, the photoreactive copolymer may include at least about 50 mol %, more specifically about 50 to about 100 mol %, preferably at least about 70 mol % of the repeating unit of the formula 3a or 3b.

In addition, the repeating unit of Chemical Formula 3a or 3b constituting the photoreactive copolymer has a degree of polymerization in the range of about 50 to about 5,000, preferably about 100 to about 4,000, and more preferably about 1,000 to about 3,000. In addition, the photoreactive copolymer may have a weight average molecular weight of about 10,000 to 1,000,000 g/mol, about 20,000 to 500,000 g/mol, or about 80,000 to about 300,000 g/mol. Therefore, the photoreactive copolymer may be suitably contained in a coating composition for forming an alignment layer to exhibit an excellent coating property, and the alignment layer prepared therefrom may exhibit an excellent alignment property, or the like.

The above-mentioned photoreactive copolymer may have photoreactivity upon exposure to a polarized light having a wavelength of about 150 to about 450 nm. For example, the photoreactive copolymer may have excellent photoreactivity and alignment property, and the like, upon exposure to a polarized light having a wavelength of about 200 to about 400 nm, more specifically about 250 to about 350 nm in a ultraviolet (UV) region.

Meanwhile, in accordance with another exemplary embodiment of the present invention, there is provided a preparation method of the above-mentioned photoreactive copolymer.

The preparation method of a photoreactive copolymer according to an exemplary embodiment of the present invention may include: performing an addition polymerization reaction of a monomer represented by following Chemical formula 1 and a monomer represented by the following Chemical Formula 2 in the presence of a catalyst composition containing a precatalyst including a transition metal in Group 10 and a cocatalyst to form a repeating unit of the following Chemical Formula 3a.

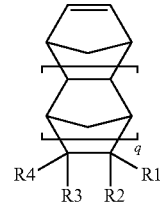

[Chemical Formula 1]

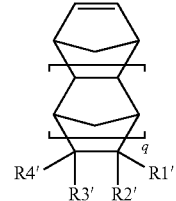

[Chemical Formula 2]

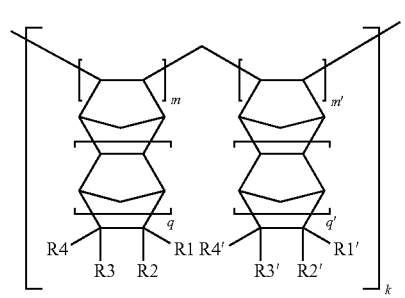

[Chemical Formula 3a]

In Chemical Formulas 1, 2, and 3a, each independently,
m, m', and k are integers from 50 to 5000,
q and q' are integers from 0 to 4,
R1, R2, R3, and R4 are as defined in Chemical Formula 1, and
R1', R2', R3', and R4' are as defined in Chemical Formula 2.

In this case, the polymerization reaction may be carried out at a temperature of about 10° C. to about 200° C. The polymerization temperature below about 10° C. lowers the polymerization activity, while the temperature above about 200° C. undesirably causes a cleavage of the catalyst.

In addition, the cocatalyst includes at least one selected from the group consisting of a first cocatalyst providing a Lewis base capable of forming a weak coordinate bond with a metal of the precatalyst; and a second cocatalyst providing a compound including a Group 15 electron donor ligand. Preferably, the cocatalyst may be a catalyst mixture including the first cocatalyst providing the Lewis base, and optionally the second cocatalyst providing a compound including a neutral Group 15 electron donor ligand.

In this case, the catalyst mixture may include, based on one mole of the precatalyst, about 1 to about 1,000 moles of the first cocatalyst and about 1 to about 1,000 moles of the second cocatalyst. The excessively low content of the first or second cocatalyst causes a failure to provide the catalyst activity enough, while an excess of the first or second cocatalyst rather deteriorates the catalyst activity.

In addition, the precatalyst including a transition metal in Group 10 may be a compound having a Lewis base functional group that is readily leaving from the central transition metal by the first cocatalyst providing a Lewis base and participating in a Lewis acid-base reaction to help the central transition metal to be changed into a catalyst active species. The examples of the precatalyst include allylpalladium chloride dimer ([(Allyl)Pd(Cl)]$_2$), palladium(II) acetate ((CH$_3$CO$_2$)$_2$Pd), palladium(II) acetylacetonate ([CH$_3$COCH=C(O—)CH$_3$]$_2$Pd), NiBr(NP(CH$_3$)$_3$)$_4$, [PdCl(NB)O(CH$_3$)]$_2$, or the like.

Further, the first cocatalyst providing a Lewis base capable of forming a weak coordinate bond with the metal of the precatalyst may be a compound that readily reacts with a Lewis base to provide vacancies in the transition metal and forms a weak coordinate bond with a transition metal compound in order to stabilize the resultant transition metal; or a compound providing such a compound. The examples of the first cocatalyst may include borane (e.g., B(C$_6$F$_5$)$_3$), borate (e.g., dimethylanilinium tetrakis(pentafluorophenyl)borate), alkylaluminum (e.g., methylaluminoxane (MAO) or Al(C$_2$H$_5$)$_3$), transition metal halide (e.g., AgSbF$_6$), or the like.

The examples of the second cocatalyst that provides a compound including a neutral Group 15 electron donor ligand may include alkyl phosphine, cycloalkyl phosphine, phenyl phosphine, or the like.

In addition, the first and second cocatalysts may be used separately, or used together to form a single salt compound to thereby be used as a compound for activating the catalyst. For example, there may be a compound prepared as an ion pair of alkyl phosphine and a borane or borate compound.

The repeating unit of Chemical Formula 3a and the photoreactive copolymer according to an exemplary embodiment, including the repeating unit may be prepared by above-mentioned method. Further, in the case in which the photoreactive copolymer further includes an olefin-, cyclic-olefin- or acrylate-based repeating unit, or the like, the photoreactive copolymer may be obtained by forming the repeating unit using a general preparation method of each of the corresponding repeating units, and then, copolymerizing the repeating unit with the repeating unit of Chemical Formula 3a prepared by the above-mentioned method.

On the other hand, in the case in which a photoreactive copolymer includes the repeating unit of Chemical Formula 3a, the photoreactive copolymer may be prepared according to another exemplary embodiment.

A preparation method of a photoreactive copolymer according to another exemplary embodiment of the present invention includes: performing a ring-opening polymerization of a norbornenol- or norbornenalkylol-based monomer in the presence of a catalyst composition containing a precatalyst including a transition metal in Group 4, 6 or 8 and a cocatalyst to form a ring-opened polymer; and introducing photoreactive groups represented by the following Chemical Formulas 1a, 2a, and 2b in the ring-opened polymer to form a repeating unit represented by the following Chemical Formula 3b.

[Chemical Formula 1a]

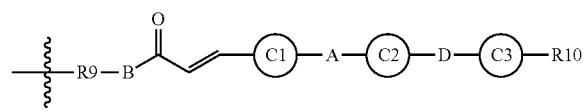

-continued

[Chemical Formula 2a]

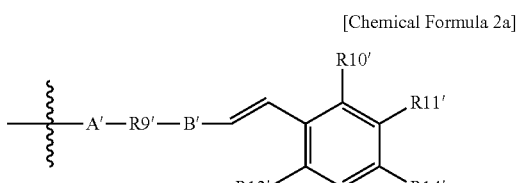

[Chemical Formula 2b]

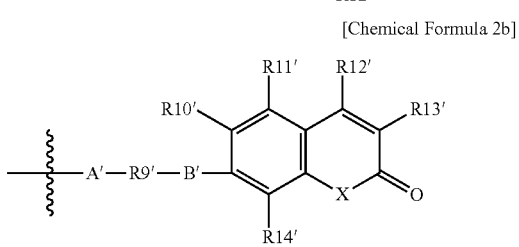

[Chemical Formula 3b]

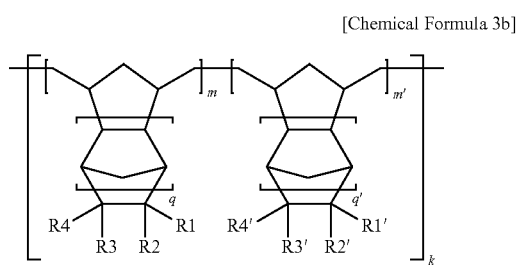

In Chemical Formula 3b, m, m', and k are integers from 50 to 5000,

R1, R2, R3, and R4 are as defined in Chemical Formula 1,

R1', R2', R3', and R4' are as defined in Chemical Formula 2, and

Each symbol in Chemical Formulas 1a, 2a, and 2b are as defined above.

In the performing of the ring-opening polymerization reaction, as hydrogen is added to a double bond of a norbornene ring included in the monomer of Chemical Formula 1, or the like, ring-opening may be performed, and polymerization is simultaneously performed, such that the repeating unit of Chemical Formula 3b, or the like, and the photoreactive copolymer including the repeating unit may be prepared. Alternatively, polymerization and ring-opening may be sequentially performed, such that the photoreactive copolymer may be prepared.

In addition, the photoreactive group may be introduced by performing a condensation reaction of the ring-opened polymer with a carboxylic acid compound or acyl chloride compound having photoreactive groups corresponding to Chemical Formula 1a, 2a, and 2b.

As another method, the repeating unit of Chemical Formula 3b may be formed by performing a ring-opening polymerization reaction of a monomer represented by the following Chemical Formula 1 and a monomer represented by the following Chemical Formula 2 in the presence of a catalyst composition containing a precatalyst including a transition metal in Group 4, 6, and 8 and a cocatalyst.

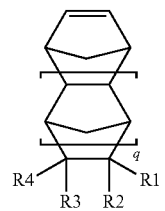

[Chemical Formula 1]

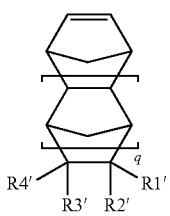

[Chemical Formula 2]

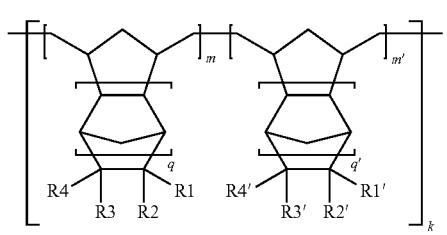

[Chemical Formula 3b]

In Chemical Formulas 1, 2, and 3b, each independently, m, m', and k are integers from 50 to 5000, q and q' are integers from 0 to 4, R1, R2, R3, and R4 are as defined in Chemical Formula 1, and R1', R2', R3', and R4' are as defined in Chemical Formula 2.

The ring-opening polymerization may be carried out in the presence of a catalyst mixture consisting of a precatalyst including a transition metal in Group 4 (e.g., Ti, Zr, or Hf), Group 6 (e.g., Mo, or W) or Group 8 (e.g., Ru, or Os); a cocatalyst providing a Lewis base capable of forming a weak coordinate bond with the metal of the precatalyst; or optionally a neutral Group 15 or Group 16 activator capable of improving the activity of the metal of the precatalyst. In the presence of the catalyst mixture as described above, a linear alkene capable of adjusting a molecular weight such as 1-alkene, 2-alkene, or the like, is added in an amount of about 1 to about 100 mol % with respect to the monomer, and a polymerization reaction is carried out at a temperature of about 10 to about 200° C. Then, a catalyst including a transition metal in Group 4 (e.g., Ti, or Zr) or Groups 8 to 10 (e.g., Ru, Ni, or Pd) is added in an amount of about 1 to about 30 wt. % with respect to the monomer to perform a hydrogenation reaction on the double bond of the norbornene ring at a temperature of about 10 to about 250° C.

A reaction temperature is excessively low, which deteriorates the polymerization activity, and the reaction temperature is excessively high, which results in a cleavage of the catalyst. A hydrogenation reaction temperature is excessively low, which deteriorates the activity of the hydrogenation reaction, and the hydrogenation reaction temperature is excessively high, which results in a cleavage of the catalyst.

The catalyst mixture includes one mole of a precatalyst including a transition metal in Group 4 (e.g., Ti, Zr, or Hf), Group 6 (e.g., Mo, or W) or Group 8 (e.g., Ru, or Os); and about 1 to about 100,000 moles of a cocatalyst providing a Lewis base capable of forming a weak coordinate bond with the metal of the precatalyst; and optionally includes about 1 to about 100 moles of an activator including a neutral element in Group 15 or 16 capable of improving the activity of the metal of the precatalyst.

A content of the cocatalyst is less than about one mole, which causes a failure in activation of the catalyst, and the content is greater than about 100,000 moles, which deteriorates the catalyst activity. The activator may be unnecessary depending on the kind of precatalyst. A content of the activator is less than about one mole, which causes a failure in activation of the catalyst, and the content is greater than about 100 moles, which results in a decrease in a molecular weight.

A content of the catalyst including the transition metal in Group 4 (e.g., Ti, or Zr) or Groups 8 to 10 (e.g., Ru, Ni, or Pd) used in the hydrogenation reaction is less than about 1 wt. % with respect to the monomer, which causes a failure in hydrogenation, and the content is greater than about 30 wt. %, which causes discoloration of the polymer.

The precatalyst including a transition metal in Group 4 (e.g., Ti, Zr, or Hf), Group 6 (e.g., Mo, or W) or Group 8 (e.g., Ru, or Os) may refer to a transition metal compound, such as $TiCl_4$, $WCl_6$, $MoCl_5$, $RuCl_3$, or $ZrCl_4$, having a functional group that is readily leaving from the central transition metal by the first cocatalyst providing a Lewis base and participating in a Lewis acid-base reaction to help the central transition metal to be changed into a catalyst active species.

In addition, the examples of the cocatalyst providing a Lewis base capable of forming a weak coordinate bond with the metal of the precatalyst may include borane or borate such as $B(C_6F_5)_3$, or alkylaluminum, alkylaluminum halide or aluminum halide, such as methylaluminoxane (MAO), $Al(C_2H_5)_3$, or $Al(CH_3)Cl_2$. Alternatively, a substituent such as lithium, magnesium, germanium, lead, zinc, tin, silicon, or the like, may be used instead of aluminum. In this manner, the cocatalyst is a compound that readily reacts with a Lewis base to provide vacancies in the transition metal and forms a weak coordinate bond with the transition metal compound in order to stabilize the produced transition metal, or a compound providing such a compound.

Depending on the type of the precatalyst, a polymerization activator may be required or not. The examples of the activator including a neutral element in Group 15 or 16 capable of improving the activity of the metal of the precatalyst may include water, methanol, ethanol, isopropyl alcohol, benzylalcohol, phenol, ethyl mercaptan, 2-chloroethanol, trimethylamine, triethylamine, pyridine, ethylene oxide, benzoyl peroxide, t-butyl peroxide, or the like.

The catalyst including a transition metal in Group 4 (e.g., Ti, or Zr) or Groups 8 to 10 (e.g., Ru, Ni, or Pd) used for the hydrogenation reaction may be prepared as a homogeneous form instantly miscible with a solvent, or as a metal catalyst complex supported on a particulate support. Preferably, the examples of the particulate support may include silica, titania, silica/chromia, silica/chromia/titania, silica/alumina, aluminum phosphate gel, silanized silica, silica hydrogel, montmorillonite clay, or zeolite.

The repeating unit of Chemical Formula 3b and the photoreactive copolymer according to an exemplary embodiment, including the repeating unit may be prepared by above-mentioned method. Further, even in the case in which the photoreactive copolymer further includes an olefin-, cyclic-olefin- or acrylate-based repeating unit, or the like, the photoreactive copolymer may be obtained by forming the repeating unit using a general preparation method of each of the corresponding repeating units, and then, copolymerizing this repeating unit and the repeating unit of Chemical Formula 3b prepared by the above-mentioned method.

Meanwhile, in accordance with another exemplary embodiment of the present invention, there is provided an alignment layer comprising the above-mentioned photoreactive copolymer. The alignment layer may include a film type alignment film as well as a thin-film type alignment layer. In accordance with another exemplary embodiment of the present invention, there is provided a liquid crystal retardation film comprising the alignment layer, and a liquid crystal layer on the alignment layer.

The alignment layer and the liquid crystal retardation film may be prepared using constituent components and preparation methods known in the art to which the present invention pertains, excepting for including the above-mentioned photoreactive copolymer as a photo-alignment polymer.

For example, the alignment layer may be formed by mixing the photoreactive copolymer with a binder and a photo-initiator, dissolving the mixture in an organic solvent to obtain a coating composition, coating and drying the coating composition on a substrate, and then curing the coating composition by UV light exposure. In this case, since the photoreactive copolymer has excellent solubility to the organic solvent, a process of forming the alignment layer may be more easily performed, and a use amount of the organic solvent may be further decreased.

As the binder, a (meth) acrylate-based compound, more specifically, pentaerythritol triacrylate, dipentaerythritol hexaacrylate, tri methylolpropane triacrylate, tris(2-acryloyloxyethyl) isocyanurate, or the like, may be used.

In addition, as the photo-initiator, any typical photo-initiator known to be applicable to alignment layers may be used without any limitations. For example, the photo-initiator known as product name Irgacure 907 or Irgacure 819 may be used.

In addition, as the organic solvent, toluene, anisole, chlorobenzene, dichloroethane, cyclohexane, cyclopentane, propylene glycol methyl ether acetate, or the like, may be used. Since the photoreactive copolymer has excellent solubility to various organic solvents, other organic solvents may also be used without any limitations.

In the coating composition, a concentration of the solid components including the photoreactive copolymer, the binder, and the photo-initiator may be in the range of about 1 to about 15 wt. %, preferably about 10 to about 15 wt. % for casting the alignment layer in a film form, or about 1 to about 5 wt. % for casting the alignment layer in a thin film form.

The alignment layer may be formed, for example, on a substrate as shown in FIG. 1, or under the liquid crystal to achieve liquid crystal alignment. Here, as the substrate, a substrate including a cyclic polymer, a substrate including an acryl polymer, or a substrate including a cellulose polymer, or the like, may be used. The coating composition is coated on the substrate by various methods, such as bar coating, spin coating, blade coating, etc. and then cured under UV light exposure, thereby forming the alignment layer.

The UV light curing may cause photo-alignment, and this step, a polarized UV light in a wavelength range of about 150 to about 450 nm is irradiated, thereby bringing about alignment. Here, an exposure intensity of the light is about 50 mJ/cm$^2$ to about 10 J/cm$^2$, preferably about 500 mJ/cm$^2$ to about 5 J/c m$^2$.

The UV light used herein may be selected from UV light polarized by passing through or being reflected from ① polarizing device using a transparent substrate such as quartz glass, soda-lime glass, soda-lime-free glass, or the like of which a dielectric anisotropic material is coated on a surface; ② a polarizer finely deposited with aluminum or other metallic wires; or ③ a Brewster polarizing device using reflection from quartz glass, or the like.

A substrate temperature during UV light irradiation is preferably room temperature. However, in some case, the UV light may be irradiated in a state in which the substrate is heated in a temperature range of about 100 t or less. Preferably, a final coating layer formed through a series of processes as described above has a layer thickness of about 30 to about 1,000 nm.

The liquid crystal retardation film may be prepared by forming the alignment layer by the above-mentioned method and forming the liquid crystal layer thereon according to a general method. As the alignment layer as described above includes the photoreactive copolymer, excellent interactions with the liquid crystal molecules may be implemented, and thus, photo-alignment may be effectively performed.

The alignment layer or the liquid crystal retardation film may be applied to optical films or filters used to implement stereoscopic images.

In accordance with another exemplary embodiment, there is provided a display device including the alignment layer. The display device may be a liquid crystal display device including the alignment layer for liquid crystal alignment, or a stereoscopic imaging display device in which the alignment layer is included in an optical film or filter such as a liquid crystal retardation film for implementing stereoscopic images, or the like. However, since constituent components of the display device are the same as those of a typical display device, except for including the above-mentioned photoreactive copolymer and the alignment layer, a detailed description thereof will be omitted.

Hereinafter, actions and effects of the present invention will be described in detail with reference to specific Examples of the present invention. However, the Examples are only for illustrative purposes and are not intended to limit the scope of the present invention.

EXAMPLE

Preparation of Cyclic Olefin Compound

Preparation Example 1

Preparation of (E)-bicyclo[2.2.1]hept-5-en-2-ylmethyl 3-(4-(4'-propylbi(cyclohexan)-4-yl)phenyl) acrylate In a flask were placed (E)-3-(4-(4'-propylbi(cyclohexan)-4-yl)phenyl)acrylic acid (100.0g, 0.28 mol, Fw=354.53), N-(3-dimethylaminopropyl)-N'-ethylcarbodiimide hydrochloride (EDCI, 87.6 g, 0.56 mol), and N,N-dimethylamidopyridine (DMAP, 68.42 g, 0.56 mol), and $CH_2Cl_2$ (1000 ml) was added thereto. 5-Norbornene-2-methanol (34.77)g, 0.28 mol, Fw=124.18) was added thereto, and stirred at room temperature for 20 hours. After the reaction was completed, water was added thereto, and the organic phase was extracted from water. Then, the organic phase was washed with saline water. The organic phase was dried over magnesium sulfate, filtered, and purified by column chromatography (EA:Hex=1:7), thereby obtaining 72.3g of the title compound (yield: 56%, Fw=460.69, purity (GC): 98%).

NMR(CDCl$_3$, 500 MHz, ppm): 0.90(3, t), 1.25~1.86(27, m), 2.13(1, quin), 2.27 (1, m), 2.58(1, m), 2.72(1, quin), 4.25(1, dd), 4.50(1, dd), 6.05(2, q), 6.31(1, d), 7.25(2, d), 7.48(1, d), 7.63(2, d)

Preparation Example 2

Preparation of (E)-(bicyclo[2.2.1]hept-5-en-2-ylmethyl) 3-(4-(5-(4-propylcyclohexyl)-1,3-dioxan-2-yl) phenyl)acrylate In a flask were placed (E)-3-(4-(5-(4-propylcyclohexyl)-1,3-dioxan-2-yl)phenyl)acrylic acid (100 g, 0.28 mol, Fw=358.47), N-(3-dimethylaminopropyl)-N'-ethylcarbodiimide hydrochloride (EDCI, 87.6 g, 0.56 mol), and N,N-dimethylamidopyridine (DMAP, 10.5 g, 0.56 mol), and CH$_2$Cl$_2$ (1000 ml) was added thereto. 5-Norbornene-2-methanol (34.77 g, 0.28 mol, Fw=124.18) was added thereto, and stirred at room temperature for 20 hours. After the reaction was completed, water was added thereto, and the organic phase was extracted from water. Then, the organic phase was washed with saline water. The organic phase was dried over magnesium sulfate, filtered, and purified by column chromatography (EA:Hex=1:7), thereby obtaining 67.7 g of the title compound (yield: 52%, Fw=464.64, purity (GC): 98%).

NMR(CDCl$_3$, 500 MHz, ppm): 0.90(3, t), 1.25~1.75(19, m), 2.13(1, sex), 2.27(1, m), 2.58(1, m), 3.63(2, dd), 3.88(2, dd), 4.25(1, dd), 4.50(1, dd), 5.98(1, s), 6.05(2, q), 6.31(1, d), 7.42(2, d), 7.48(1, d), 7.64(2, d)

Preparation Example 3

Preparation of (E)-(bicyclo[2.2.1]hept-5-en-2-ylmethyl) 3-(4'-(4-propylcyclohexyl)biphenyl-4-yl)acrylate In a flask were placed (E)-3-(4'-(4-propylcyclohexyl)biphenyl-4-yl)acrylic acid (25 g, 71.7 mmol, Fw=348.48), 5-norbornene-2-methanol (8.90 g, 71.7 mmol, Fw=124.18), zirconium acetate hydroxide (0.25 g, 1 wt. %), and xylene (60 ml), and then, azeotropic reflux was conducted at 180° C. in the nitrogen atmosphere for about 24 hours. After reaction, a temperature was lowered to room temperature and 100 vol. % of ethyl acetate was added thereto. The organic phase was extracted with 1M HCl and washed with water once more. The organic phase was dried over magnesium sulfate, followed by removal of the solvent. The resultant was purified by column chromatography (EA: Hex=1:10), thereby obtaining 21.19 g of the title compound (yield: 65%, Fw=454.64, purity (GC): 98%).

NMR(CDCl$_3$, 500 MHz, ppm): 0.90(3, t), 1.50~1.86(17, m), 2.13(1, sex), 2.27(1, m), 2.58(1, m), 2.72(1, quin), 4.25(1, dd), 4.50(1, dd), 6.05(2, q), 6.31(1, d), 7.36(2, s), 7.37(2, d), 7.44(2, d), 7.48(1, s), 7.59(2, d)

Preparation Example 4

Preparation of (E)-3-((bicyclo[2.2.1]hept-5-en-2-yl) propyl) 3-(4-(4'-propylbi(cyclohexan)-4-yl)phenyl) acrylate In a flask were placed (E)-3-(4-(4'-propylbi(cyclohexan)-4-yl)phenyl)acrylic acid (25 g, 70.5 mmol, Fw=354.53), 5-norbornene-2-propanol (10.7 g, 70.5 mmol, Fw=152.24), zirconium acetate hydroxide (0.25 g, 1 wt. %), and xylene (30 ml), and then, azeotropic reflux was conducted at 180° C. in the nitrogen atmosphere for about 24 hours. After reaction, a temperature was lowered to room temperature and 100 vol. % of ethyl acetate was added thereto. The organic phase was extracted with 1M HCl and washed with water once more. The organic phase was dried over magnesium sulfate, and the solvent was removed, followed by purification through column chromatography (EA:Hex=1: 10), thereby obtaining 24.46 g of the title compound (yield: 71%, Fw=488.74, purity (GC): 98%).

NMR(CDCl$_3$, 500 MHz, ppm): 0.90(3, t), 1.25~1.86(22, m), 2.27(1, m), 2.58(1, m), 2.72(1, quin), 4.15(2, t), 6.05(2, q), 6.31(1, d), 7.36(2, s), 7.37(2, d), 7.44(2, d), 7.48(1, s), 7.59(2, d)

Preparation Example 5

Preparation of (E)-(bicyclo[2.2.1]hept-5-en-2-ylmethyl) 3-(4-fluorophenyl)acrylate 4-F cinnamic acid (10 g, 60 mmol), 5-norbornene-2-methanol (7.45 g, 60 mmol, Fw=152.24), zirconium acetate hydroxide (0.3 g, 0,02 equivalents) were added to toluene (50 ml) and stirred. Azeotropic reflux was conducted at 145° C. in the nitrogen atmosphere for about 24 hours. After reaction, a temperature was lowered to room temperature and 100 vol. % of ethyl acetate was added thereto. The organic phase was extracted with 1M HCl and washed with water once more. The organic phase was dried over magnesium sulfate, and the solvent was removed, followed by purification through column chromatography (EA:Hex=1: 10), thereby obtaining 11.11 g of the title compound (yield: 68%, Fw=272.31, purity (GC): 92%).

NMR(CDCl$_3$, 500 MHz, ppm): 1.35~1.75(4, m), 2.13(1, m), 2.27(1, m), 2.58(1, m), 4.25(1, m), 4.50(1, m), 6.23(2, d), 6.31(1, d), 7.19(2, t), 7.48(1, d), 7.72(2, m)

Preparation of Photoreactive Copolymer by Addition Polymerization

Example 1

Polymerization of (E)-bicyclo[2.2.1]hept-5-en-2-ylmethyl 3-(4-(4'-propylbi(cyclohexan)-4-yl)phenyl) acrylate and (E)-(bicyclo[2.2.1]hept-5-en-2-ylmethyl) 3-(4-fluorophenyl)acrylate In a 250 ml Schlenk flask were placed the compound (25 mmol) prepared in Preparation Example 1 and the compound (25 mmol) prepared in Preparation Example 5 as monomers, and 400 wt. % of purified toluene as a solvent, and 10 mol % of 1-octene was added thereto. The mixture was heated to 90° C. while being stirred, and Pd(OAc)$_2$ (16 umol) and tricyclohexylphosphine (32 umol) dissolved in 1 ml of dichloromethane as a catalyst and dimethylanilinium tetrakis(pentafluorophenyl)borate (32 umol) as a cocatalyst were added thereto. The mixture was stirred at 90° C. for 16 hours, thereby performing a reaction.

After the reaction, the reactant was put in an excess of ethanol to obtain a white polymer precipitate. The precipitate was filtered through a glass funnel to collect a polymer, and the collected polymer was dried in a vacuum oven at 60° C. for 24 hours, thereby obtaining a polymer (Mw=163,000, PDI=2.12, yield=67%),

Example 2

Polymerization of (E)-(bicyclo[2.2.1]hept-5-en-2-ylmethyl) 3-(4-(5-(4-propylcyclohexyl)-1,3-dioxan-2-yl)phenyl)acrylate and (E)-(bicyclo[2.2.1]hept-5-en-2-ylmethyl) 3-(4-fluorophenyl)acrylate A reaction was carried out by the same method as in Example 1 except for using the compounds prepared in Preparation Examples 2 and 5 instead of the compounds prepared in Preparation Examples 1 and 5, thereby obtaining a polymer (Mw=178,000, PDI=2.68, yield=64%).

Example 3

Polymerization of (E)-(bicyclo[2.2.1]hept-5-en-2-ylmethyl) 3-(4'-(4-propylcyclohexyl)biphenyl-4-yl)acrylate and (E)-(bicyclo[2.2.1]hept-5-en-2-ylmethyl) 3-(4-fluorophenyl)acrylate A reaction was carried out by the same method as in Example 1 except for using the compounds prepared in Preparation Examples 3 and 5 instead of the compounds prepared in Preparation Examples 1 and 5, thereby obtaining a polymer (Mw=159,000, PDI=2.72, yield=54%).

Example 4

Polymerization of (E)-3-((bicyclo[2.2.1]hept-5-en-2-yl)propyl) 3-(4-(4'-propylbi(cyclohexan)-4-yl)phenyl)acrylate and (E)-(bicyclo[2.2.1]hept-5-en-2-ylmethyl) 3-(4-fluorophenyl)acrylate A reaction was carried out by the same method as in Example 1 except for using the compounds prepared in Preparation Examples 4 and 5 instead of the compounds prepared in Preparation Examples 1 and 5, thereby obtaining a polymer (Mw=162,000, PDI=2.11, yield=58%).

Preparation of Photoreactive Copolymer by Ring-Opening Polymerization and Hydrogenation Reaction

Example 5

In a 250 ml Schlenk flask in the Ar atmosphere was placed 5-norbornene-2-methanol (6.20 g, 50 mmol), and then purified toluene (34 g) was added thereto as a solvent. With the flask maintained at a polymerization temperature of 80° C., first, triethyl aluminum (11.4 mg, 1.0 mmol) was added thereto as a cocatalyst. Subsequently, 0.01 M (mol/L) toluene solution (1 ml (WCl$_8$: 0.01 mmol, ethanol: 0.03 mmol) containing a mixture of tungsten hexachloride (WCl$_6$) and ethanol at a mixing ratio of 1:3 was added thereto. Finally, 1-octene (0.84 g, 7.5 mmol) as a molecular weight modifier was added to the flask, and then the mixture was stirred at 80° C. for 18 hours, thereby performing a reaction. After the reaction was completed, a small amount of ethyl vinyl ether as a polymerization inhibitor was added dropwise to the polymerization solution, and the flask was stirred for 5 minutes.

After transferring the polymerization solution to a 300 mL high-pressure reactor, triethyl aluminum (TEA, 0.06 ml) was added thereto. Subsequently, grace raney nickel (0.50 g, slurry phase in water) was added thereto, and the polymerization solution was stirred at 150° C. for 2 hours under the hydrogen pressure maintained at 80 atm, thereby performing a reaction. After the reaction was completed, the polymerization solution was added dropwise to acetone to cause precipitation. Thereafter, the obtained precipitate was filtered and dried in a vacuum oven at 70° C. for 15 hours. As a result, 5.59 g of a ring-opened hydrogenated polymer of 5-norbornene-2-methanol was obtained (yield=90.2%, Mw=67,300, PDI=4.31).

In a 250 ml two-neck flask were placed the ring-opened hydrogenated polymer of 5-norbornene-2-methanol (15 g, 0.121 mol), triethylamine (Aldrich, 61.2 g, 0.605 mol), and THF (50 ml), and then, the mixture was stirred in an ice-water bath at 0° C. (E)-3-(4-(4'-propylbi(cyclohexan)-4-yl)phenyl)acryloyl chloride (24.80 g, 0.067 mol, Fw=372.97) and (E)-3-(4-fluorophenyl)acryloyl chloride (12.28 g, 0.067 mol, Fw=184.59) were dissolved in THF (60 ml) and slowly added using an additional flask. After 10 minutes, the reactant was warmed to room temperature and stirred for 18 more hours. The solution was diluted with ethyl acetate, transferred to a separatory funnel, and washed with water and NaHCO$_3$ several times. The reaction solution was added dropwise to acetone to cause precipitation, and the resultant precipitate was filtered and dried in a vacuum oven at 70° C. for 15 hours. As a result, a ring-opened hydrogenated polymer of the monomer was prepared (yield: 91%),

Comparative Example 1

Preparation of (E)-bicyclo[2.2.1]hept-5-en-2ylmethyl-3-(4-fluorophenyl)acrylate

In a 250 ml Schlenk flask were placed the compound (50 mmol) prepared in Preparation Example 5 as a monomer, and 400 wt. % of purified toluene as a solvent, and 10 mol % of 1-octene was added thereto. The mixture was heated to 90° C. while being stirred, and Pd(OAc)$_2$ (16 umol) and tricyclohexylphosphine (32 umol) dissolved in 1 ml of dichloromethane as a catalyst and dimethylanilinium tetrakis(pentafluorophenyl)borate (32 umol) as a cocatalyst were added thereto. The mixture was stirred at 90° C. for 16 hours, thereby performing a reaction.

After the reaction, the reactant was put in an excess of ethanol to obtain a white polymer precipitate. The precipitate was filtered through a glass funnel to collect a polymer, and the collected polymer was dried in a vacuum oven at 60° C. for 24 hours, thereby obtaining a polymer (Mw=162,000, PDI=2.71, yield=82%),

Preparation of Alignment Layer 3 wt. % of the photoreactive copolymers according to Examples 1 to 5 and Comparative Example 1, 1.0 wt. % of an acrylate based binder (PETA), and 0.5 wt. % of a photoinitiator (Irgacure 907 manufactured by Ciba-Geigy Chemical Corp.) were dissolved in a toluene solvent, respectively, and these solvents were dropped and bar-coated on a COP film, respectively.

After drying the bar-coated COP film at 80° C. for 2 minutes, polarized UV light (15mJ/cm$^2$) was irradiated thereon. In order to confirm a change in a liquid crystal alignment direction, after a half of the cured alignment layer was shielded and the cured alignment layer was rotated at 90 degrees, the same polarized UV light was irradiated again. The quantity of the polarized UV light was adjusted by time.

A-plate liquid crystals (manufacturer: Merck, 25 wt. % toluene solution) were dropped and bar-coated on the alignment layer, and UV light (15 mJ/cm$^2$) was irradiated thereon, followed by curing the liquid crystals, thereby obtaining a retardation film.

EXAMPLE

Evaluation of Alignment Property

Each of the retardation films prepared above was observed with a polarized microscope between two vertically arranged polarizers, thereby evaluating the alignment property.

That is, the retardation film was disposed between two vertically arranged polarizers based on a COP film (manufacturer: Zeon, product name: Zeonor) having a thickness of 100 μm, and a polarized microscope was used to determine the transmittance of an incident light passing through the polarizers and the retardation film, thereby measuring a degree of light leakage. In this case, the degree of light leakage was evaluated based on a 10-point scale.

In addition, a quantitative phase difference value was measured using an Axoscan (Axomatrix). In this case, a phase difference value in a film surface direction was measured using light having a wavelength of 550 nm.

TABLE 1

|  | Primary Alignment | | Secondary Alignment | |
|---|---|---|---|---|
|  | Alignment Property | Phase Difference Value | Alignment Property | Phase Difference Value |
| Example 1 | 10 | 132 | 10 | 132 |
| Example 3 | 10 | 131 | 10 | 131 |
| Comparative Example 1 | 10 | 131 | 8 | 112 |

Referring to Table 1, in the retardation films manufactured using the copolymers of Examples, a liquid crystal alignment direction was uniform irrespective of a wavelength of the incident light, such that the retardation films had a good alignment property, and in-film phase difference values thereof were in the range of about 131 nm to about 132 nm in secondary alignment, such that it may be confirmed that excellent anisotropic properties by liquid crystals were implemented.

On the contrary, in the retardation film manufactured using the polymer of Comparative Example 1, the alignment property was somewhat good in primary alignment, but in secondary alignment, a liquid crystal alignment direction was not uniform, such that it may be confirmed that light leakage occurred. In addition, in spite of the same liquid crystal thickness, the phase difference value was low (about 112 nm), such that it may be confirmed that anisotropic properties were not suitably implemented.

The invention claimed is:

1. A photoreactive copolymer comprising:
   a copolymer of a cyclic olefin monomer represented by the following Chemical Formula 1 and cyclic olefin monomer represented by the following Chemical Formula 2:

[Chemical Formula 1]

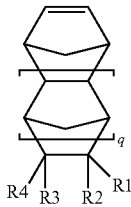

in Chemical Formula 1,
q is an integer from 0 to 4;
at least one of R1, R2, R3, and R4 is a radical represented by the following Chemical Formula 1a,
among R1 to R4, the remainders other than the radical of Chemical Formula 1a are the same as or different from one another and each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted arylalkyl having 5 to 12 carbon atoms; and a polar functional group including at least one atom selected from oxygen, nitrogen, phosphorus, sulfur, silicon, and boron,
when R1 to R4 are not hydrogen, halogen, or a polar functional group, at least one combination of R1 and R2 or R3 and R4 is bonded to each other to form an alkylidene group having 1 to 10 carbon atoms, or R1 or R2 is bonded to either R3 or R4 to form a saturated or unsaturated aliphatic ring having 4 to 12 carbon atoms or an aromatic ring having 6 to 24 carbon atoms,

[Chemical Formula 1a]

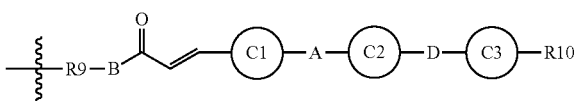

in Chemical Formula 1a,
A is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms,
B is a single bond, oxygen, sulfur, —NH—, or 1,4-phenylene,
R9 is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, C1 is C6-C40 arylene unsubstituted or substituted with at least one functional group selected from the group consisting of halogen, cyano, and nitro; C7-C15 arylalkylene unsubstituted or substituted with at least one functional group selected from halogen, cyano, and nitro; or C4-C40 heteroarylene including a hetero element in Group 14, 15 or 16, C2 is C6-C40 arylene unsubstituted or substituted with at least one functional group selected from the group consisting of halogen, cyano, and nitro; C4-C40 heteroarylene including a hetero element in Group 14, 15 or 16; C5-C10 cycloalkylene; or C4-C40 heterocycloalkylene including a hetero element in Group 14, 15, or 16, C3 is C5-C10 cycloalkylene; or C4-C40 heterocycloalkylene including a hetero element in Group 14, 15, or 16, D is selected from the group consisting of a single bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted arylalkylene having 7 to 15 carbon atoms, and substituted or unsubstituted alkynylene having 2 to 20 carbon atoms, R10 is selected from the group consisting of hydrogen; halogen; cyano; nitro; —NCS; substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms,

[Chemical Formula 2]

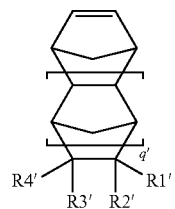

in Chemical Formula 2, q' is an integer from 0 to 4;

at least one of R1', R2', R3', and R4' is a radical selected from the group consisting of compounds represented by the following Chemical Formulas 2a and 2b, among R1' to R4', the remainders other than the radical of Chemical Formula 2a or 2b are the same as or different from one another and each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group including at least one atom selected from oxygen, nitrogen, phosphorus, sulfur, silicon, and boron, when R1' to R4' are not hydrogen; halogen; or a polar functional group, at least one combination of R1' and R2' or R3' and R4' is bonded to each other to form an alkylidene group having 1 to 10 carbon atoms, or R1' or R2' is bonded to either R3' or R4' to form a saturated or unsaturated aliphatic ring having 4 to 12 carbon atoms or an aromatic ring having 6 to 24 carbon atoms,

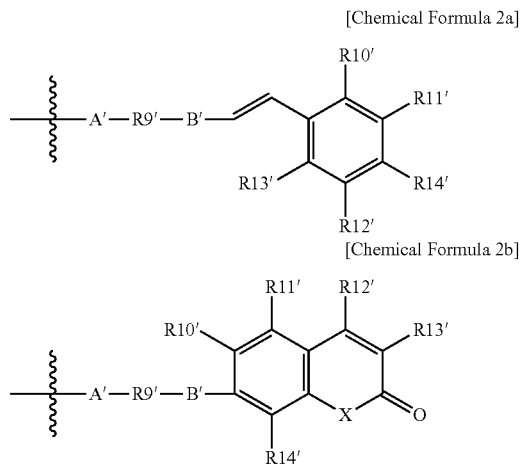

in Chemical Formulas 2a and 2b,

A' is a single bond, oxygen, sulfur, or —NH—,

B' is selected from the group consisting of a single bond, substituted or unsubstituted alkylene having 1 to 20 carbon atoms, carbonyl, carboxyl, ester, substituted or unsubstituted arylene having 6 to 40 carbon atoms, and substituted or unsubstituted heteroarylene having 6 to 40 carbon atoms, X is oxygen or sulfur, R9' is selected from the group consisting of a single bond, substituted or unsubstituted alkylene having 1 to 20 carbon atoms, substituted or unsubstituted alkenylene having 2 to 20 carbon atoms, substituted or unsubstituted alkynylene having 2 to 20 carbon atoms, substituted or unsubstituted cycloalkylene having 3 to 12 carbon atoms, substituted or unsubstituted arylene having 6 to 40 carbon atoms, and substituted or unsubstituted arylalkylene having 7 to 15 carbon atoms, and at least one of R10', R11', R12', R13', and R14' is halogen, or C1-C20 alkyl substituted with halogen, and the remainders are the same as or different from one another and each independently selected from the group consisting of substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, heteroaryl having 6 to 40 carbon atoms and including a hetero element in Group 14, 15, or 16, and substituted or unsubstituted alkoxyaryl having 6 to 40 carbon atoms.

2. The photoreactive copolymer of claim 1, wherein the polar functional group including at least one atom selected from oxygen, nitrogen, phosphorus, sulfur, silicon, and boron is selected from the group consisting of the following functional groups:

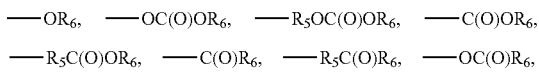

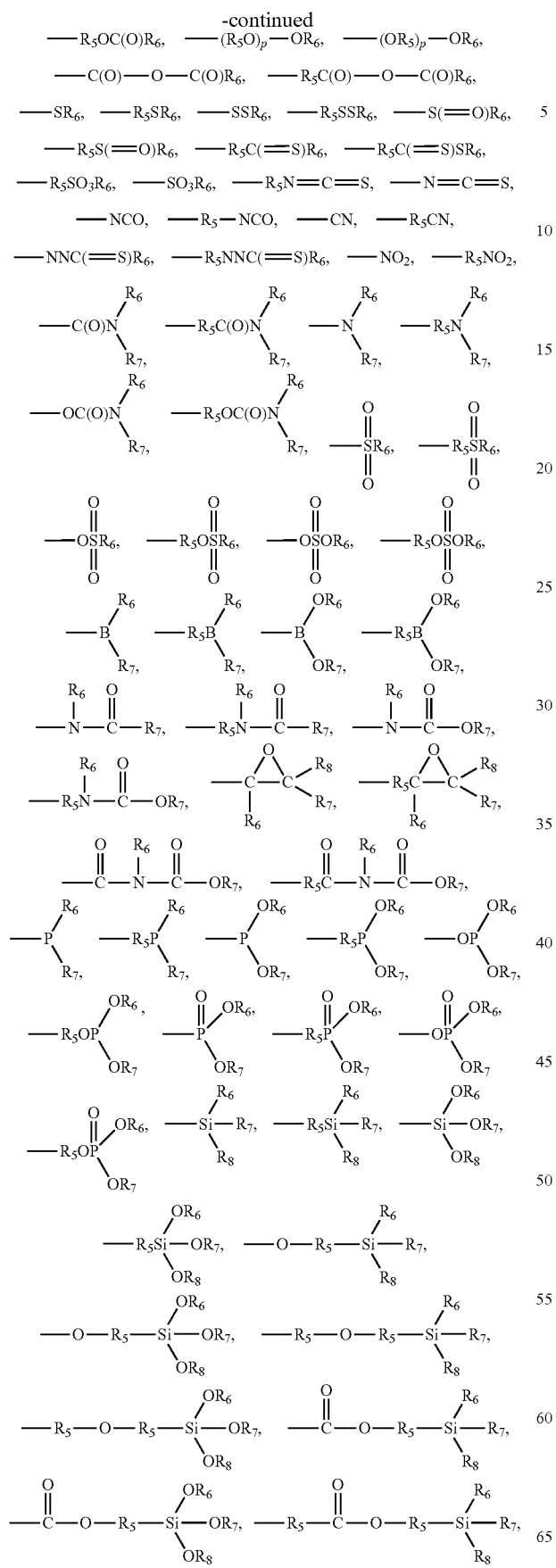
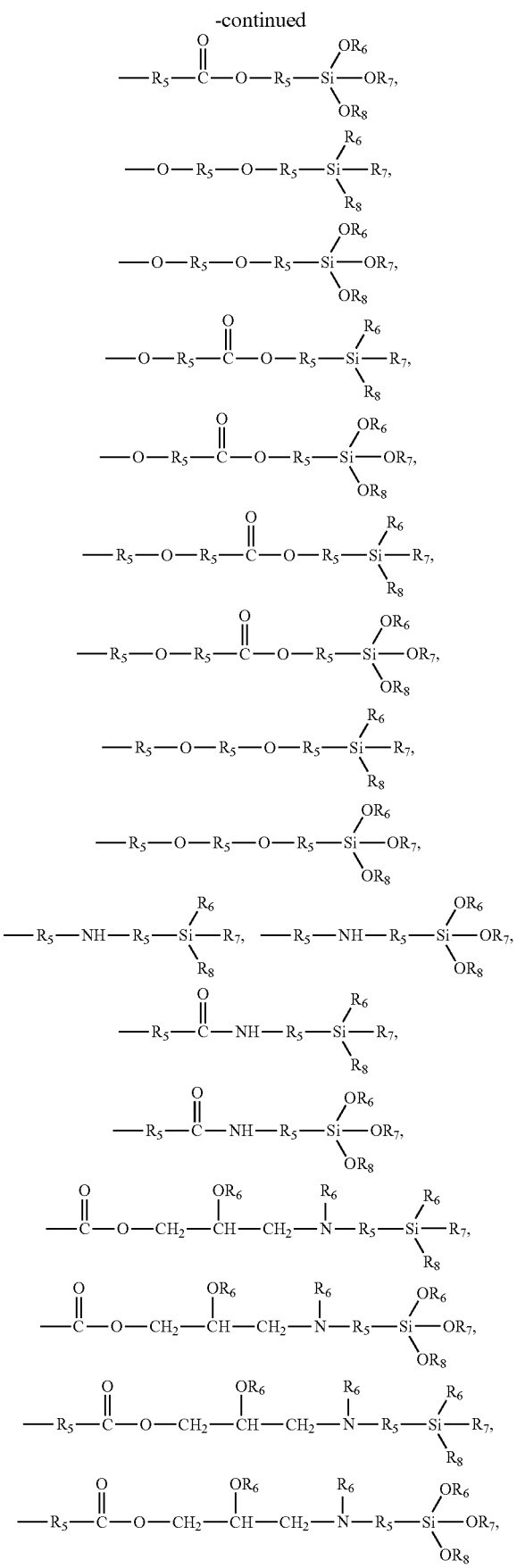

-continued

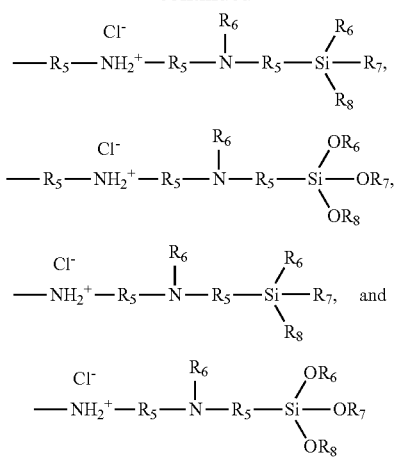

wherein, each p is independently an integer from 1 to 10, $R_5$ is substituted or unsubstituted linear or branched alkylene having 1 to 20 carbon atoms; substituted or unsubstituted linear or branched alkenylene having 2 to 20 carbon atoms; substituted or unsubstituted linear or branched alkynylene having 2 to 20 carbon atoms; substituted or unsubstituted cycloalkylene having 3 to 12 carbon atoms; substituted or unsubstituted arylene having 6 to 40 carbon atoms; substituted or unsubstituted carbonyloxylene having 1 to 20 carbon atoms; or substituted or unsubstituted alkoxylene having 1 to 20 carbon atoms; and $R_6$, $R_7$, and $R_8$ are each independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted alkoxy having 1 to 20 carbon atoms; and substituted or unsubstituted carbonyloxy having 1 to 20 carbon atoms.

3. The photoreactive copolymer of claim 1, wherein it includes a repeating unit of the following Chemical Formula 3a or 3b:

[Chemical Formula 3a]

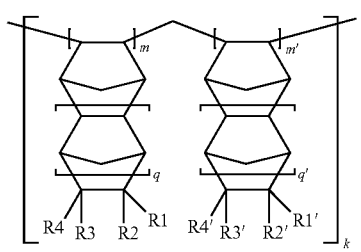

[Chemical Formula 3b]

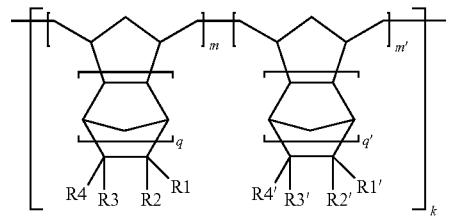

in Chemical Formulas 3a and 3b, each independently,
m, m', and k are integers from 50 to 5000,
q and q' are integers from 0 to 4,
R1, R2, R3, and R4 are as defined in Chemical Formula 1 of claim 1, and
R1', R2', R3', and R4' are as defined in Chemical Formula 2 of claim 1.

4. The photoreactive copolymer of claim 1, wherein the photoreactive copolymer has a weight molecular average weight of 10,000 to 1,000,000 g/mol.

5. The photoreactive copolymer of claim 1, wherein R1' of Chemical Formula 2 is a radical represented by Chemical Formula 2a, and at least one of R10' to R14' of Chemical Formula 2a is halogen.

6. A preparation method of the photoreactive copolymer of claim 1, the preparation method comprising: performing an addition polymerization reaction of a monomer represented by the following Chemical formula 1 and a monomer represented by the following Chemical Formula 2 in the presence of a catalyst composition including a precatalyst including a transition metal in Group 10 and a cocatalyst to form a repeating unit of the following Chemical Formula 3a:

[Chemical Formula 1]

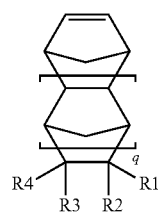

[Chemical Formula 2]

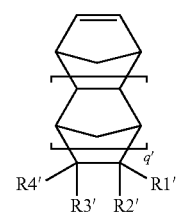

[Chemical Formula 3a]

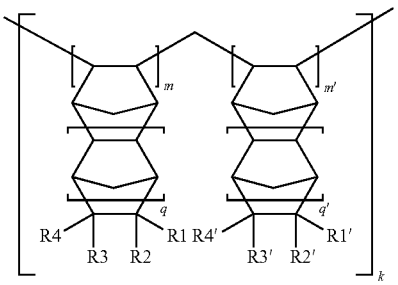

in Chemical Formulas 1, 2, and 3a,
m, m', and k are integers from 50 to 5000,
q and q' are integers from 0 to 4,
R1, R2, R3, and R4 are as defined in Chemical Formula 1 of claim 1, and
R1', R2', R3', and R4' are as defined in Chemical Formula 2 of claim 1.

7. A preparation method of the photoreactive copolymer of claim 1, the preparation method comprising:
performing a ring-opening polymerization of a norbornenol- or norbornenalkylol-based monomer in the presence of a catalyst composition including a precatalyst including a transition metal in Group 4, 6 or 8 and a cocatalyst to form a ring-opened polymer; and
introducing photoreactive groups represented by the following Chemical Formulas 1a, 2a, and 2b in the ring-opened polymer to form a repeating unit represented by the following Chemical Formula 3b:

[Chemical Formula 1a]

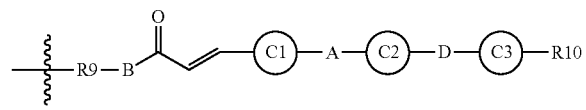

[Chemical Formula 2a]

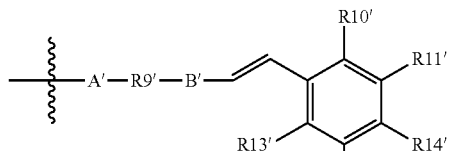

[Chemical Formula 2b]

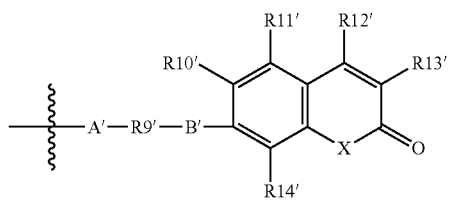

[Chemical Formula 3b]

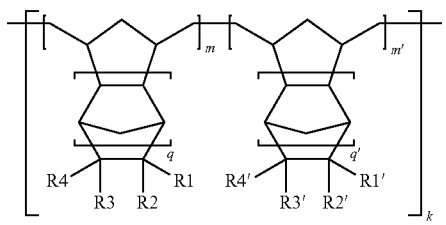

in Chemical Formula 3b, m, m', and k are integers from 50 to 5000,
R1, R2, R3, and R4 are as defined in Chemical Formula 1 of claim 1,
R1', R2', R3', and R4' are as defined in Chemical Formula 2 of claim 1, and
each symbol in Chemical Formulas 1a, 2a, and 2b are as defined in claim 1.

8. The preparation method of claim 7, wherein in the performing of the ring-opening polymerization reaction, a hydrogenation reaction is performed on a double bond in a norbornene ring, such that the ring-opening and polymerization are performed.

9. An alignment layer comprising the photoreactive copolymer of claim 1.

10. A liquid crystal retardation film comprising the alignment layer of claim 9 and a liquid crystal layer on the alignment layer.

11. A display device comprising the alignment layer of claim 9.

12. An alignment layer comprising the photoreactive copolymer of claim 2.

13. An alignment layer comprising the photoreactive copolymer of claim 3.

14. An alignment layer comprising the photoreactive copolymer of claim 4.

15. An alignment layer comprising the photoreactive copolymer of claim 5.

* * * * *